United States Patent
Nishimura

(10) Patent No.: US 11,209,008 B2
(45) Date of Patent: Dec. 28, 2021

(54) PUMP APPARATUS, TEST OPERATION METHOD OF PUMP APPARATUS, MOTOR ASSEMBLY AND METHOD FOR IDENTIFYING ABNORMAL VIBRATION OF MOTOR ASSEMBLY

(71) Applicant: EBARA CORPORATION, Tokyo (JP)

(72) Inventor: Kazuma Nishimura, Tokyo (JP)

(73) Assignee: EBARA CORPORATION, Tokyo (JP)

(*) Notice: Subject to any disclaimer, the term of this patent is extended or adjusted under 35 U.S.C. 154(b) by 68 days.

(21) Appl. No.: 16/229,778

(22) Filed: Dec. 21, 2018

(65) Prior Publication Data

US 2019/0203729 A1 Jul. 4, 2019

(30) Foreign Application Priority Data

Dec. 28, 2017 (JP) ............... JP2017-253422
Dec. 28, 2017 (JP) ............... JP2017-253423
Dec. 28, 2017 (JP) ............... JP2017-253424

(51) Int. Cl.
*F04D 27/00* (2006.01)
*G01M 13/045* (2019.01)
(Continued)

(52) U.S. Cl.
CPC ............ *F04D 27/004* (2013.01); *F04C 14/08* (2013.01); *F04C 14/28* (2013.01);
(Continued)

(58) Field of Classification Search
CPC ............ F04D 13/0686; F04D 15/0066; F04D 15/0077; F04D 15/0245; F04D 15/0281;
(Continued)

(56) References Cited

U.S. PATENT DOCUMENTS 5,203,178 A * 4/1993 Shyu .................. F04C 28/28
417/14
2014/0244051 A1* 8/2014 Rollins ................ F04D 19/002
700/282

(Continued)

FOREIGN PATENT DOCUMENTS

GB 2536461 A 9/2016
JP S55-101705 A 8/1980
(Continued)

OTHER PUBLICATIONS

Extended European Search Report issued in European Patent Application No. 18 21 5617 dated Jun. 24, 2019.
Extended European Search Report issued in European Patent Application No. EP 2018 8820.3 dated Sep. 14, 2020.
Japanese Office Action issued in Japanese Patent Application No. 2017-253424 dated Sep. 7, 2021.
(Continued)

*Primary Examiner* — Bryan M Lettman
(74) *Attorney, Agent, or Firm* — Pearne & Gordon LLP

(57) ABSTRACT

A pump apparatus which can more accurately determine the occurrence of an abnormal vibration. The pump apparatus includes: a pump; an electric motor for driving the pump; an inverter as a speed changing means for the electric motor; a vibration detector for detecting at least one of a vibration of the pump, a vibration of the electric motor and a vibration of the inverter; and a controller for controlling the pump. The controller includes a storage unit for storing a measured vibration value measured by the vibration detector. The storage unit has a storage table which, when the rotational speed of the pump is increased stepwise to a predetermined rotational speed, stores the measured vibration value measured at each step.

24 Claims, 22 Drawing Sheets

(51) Int. Cl.
*G01H 1/00* (2006.01)
*F04D 15/00* (2006.01)
*F04C 14/08* (2006.01)
*F04C 14/28* (2006.01)
*H02P 23/00* (2016.01)
*H02P 29/00* (2016.01)

(52) U.S. Cl.
CPC ..... *F04D 15/0066* (2013.01); *F04D 15/0077* (2013.01); *F04D 15/0088* (2013.01); *F04D 27/001* (2013.01); *G01H 1/003* (2013.01); *G01M 13/045* (2013.01); *H02P 23/00* (2013.01); *H02P 29/00* (2013.01); *F04C 2270/125* (2013.01); *F05D 2270/334* (2013.01)

(58) Field of Classification Search
CPC .. F04D 27/004; F04D 27/008; F04D 27/0261; F04D 27/0292; F04D 15/0088; F04D 27/001; F04B 49/06; F04B 49/065; F04B 49/103; F04B 49/20; F04B 53/001; F04B 2201/1201; F04B 2203/0206; F04B 2203/0209; F04C 14/08; F04C 14/28; F04C 28/08; F04C 28/28; F04C 2270/12; F04C 2270/125; F04C 2270/05; F04C 2270/051; F04C 2270/052; F04C 2270/0525; F04C 2270/13; F04C 2270/135; G01M 13/045; F05D 2270/334; G01H 1/003; H02P 7/00; H02P 8/14; H02P 9/00; H02P 23/00–30; H02P 29/00; H02P 29/50
See application file for complete search history.

(56) References Cited

U.S. PATENT DOCUMENTS

| | | | |
|---|---|---|---|
| 2014/0377084 | A1 | 12/2014 | Kösters et al. |
| 2015/0361991 | A1* | 12/2015 | Surowinski ......... F04D 29/5813 415/175 |
| 2018/0058463 | A1* | 3/2018 | Rollins ................. F04D 29/002 |

FOREIGN PATENT DOCUMENTS

| | | | |
|---|---|---|---|
| JP | S62-245931 A | | 10/1987 |
| JP | H02-9969 A | | 1/1990 |
| JP | H02-11879 A | | 1/1990 |
| JP | H04-194385 A | | 7/1992 |
| JP | H07-218333 A | | 8/1995 |
| JP | H07-324974 A | | 12/1995 |
| JP | H11-311195 A | | 11/1999 |
| JP | 2001-330510 A | | 11/2001 |
| JP | 2003-036321 A | | 2/2003 |
| JP | 2008-131713 A | | 6/2008 |
| JP | 2008-298527 A | | 12/2008 |
| JP | 2009-050078 A | | 3/2009 |
| JP | 2010-071866 A | | 4/2010 |
| JP | 2012-034427 A | | 2/2012 |
| JP | 2013-029484 A | | 2/2013 |
| JP | 2013029484 | * | 7/2013 |
| JP | 2015-502513 A | | 1/2015 |
| JP | 2015-231295 A | | 12/2015 |
| JP | 2016-007113 A | | 1/2016 |
| JP | 2016-017418 A | | 2/2016 |
| WO | 2011-113023 A1 | | 9/2011 |

OTHER PUBLICATIONS

Chinese Office Action issued in Chinese Patent Application No. 201811608474.9 dated Aug. 4, 2021.
Japanese Office Action dated Oct. 26, 2021 issued in Japanese Patent Application No. 2017-253422.

* cited by examiner

FIG. 6

|  | f1 | f2 | •••• | f3 | •••• | PRESSURE |
|---|---|---|---|---|---|---|
| 5Hz |  |  |  |  |  |  |
| 10Hz |  |  |  |  |  |  |
| ⋮ | ⋮ | ⋮ | ⋮ | ⋮ | ⋮ |  |
| 50Hz |  |  |  |  |  |  |

Tb11

Tb12

Tb13

Tb14

FIG. 7
OCCURRENCE OF ABNORMALITY IN THE DRIVE SHAFT
(1) 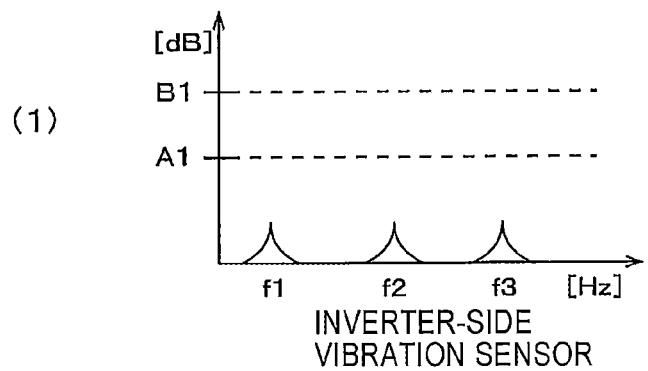
INVERTER-SIDE VIBRATION SENSOR
(2) 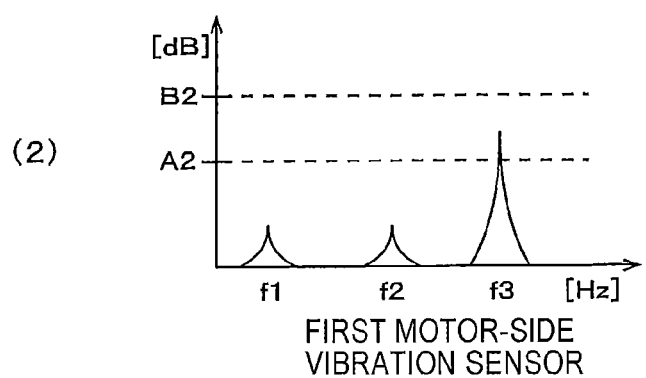
FIRST MOTOR-SIDE VIBRATION SENSOR
(3) 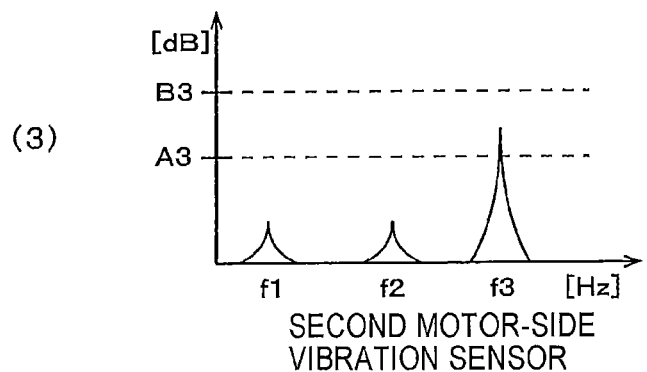
SECOND MOTOR-SIDE VIBRATION SENSOR

FIG. 9

|  | DETECTION/NON-DETECTION OF ABNORMAL VIBRATION |
|---|---|
| INVERTER-SIDE VIBRATION SENSOR | NOT DETECTED |
| FIRST MOTOR-SIDE VIBRATION SENSOR | DETECTED |
| SECOND MOTOR-SIDE VIBRATION SENSOR | DETECTED |

|  | DETECTION/NON-DETECTION OF ABNORMAL VIBRATION |
|---|---|
| INVERTER-SIDE VIBRATION SENSOR | NOT DETECTED |
| FIRST MOTOR-SIDE VIBRATION SENSOR | DETECTED |
| SECOND MOTOR-SIDE VIBRATION SENSOR | NOT DETECTED |

FIG. 15

|  | DETECTION/NON-DETECTION OF ABNORMAL VIBRATION |
|---|---|
| INVERTER-SIDE VIBRATION SENSOR | DETECTED |
| FIRST MOTOR-SIDE VIBRATION SENSOR | NOT DETECTED |
| SECOND MOTOR-SIDE VIBRATION SENSOR | NOT DETECTED |

FIG. 16
OCCURRENCE OF ABNORMALITY IN THE MOTOR CASING AND THE INVERTER HOUSING
(1) 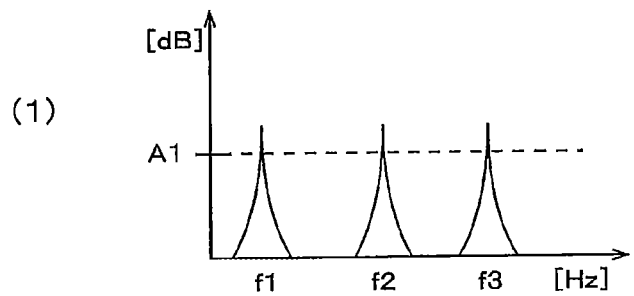
INVERTER-SIDE VIBRATION SENSOR
(2) 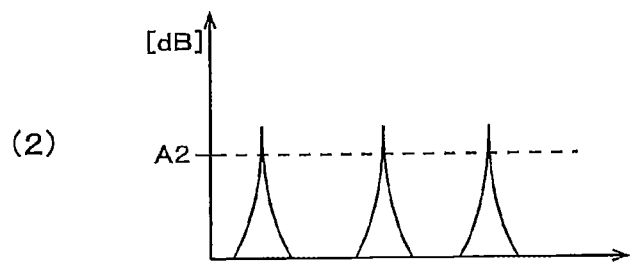
FIRST MOTOR-SIDE VIBRATION SENSOR
(3) 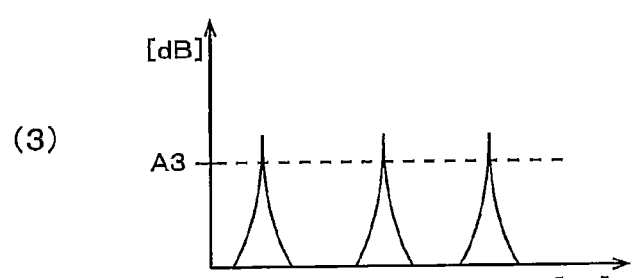
SECOND MOTOR-SIDE VIBRATION SENSOR

|  | DETECTION/NON-DETECTION OF ABNORMAL VIBRATION |
|---|---|
| INVERTER-SIDE VIBRATION SENSOR | DETECTED |
| FIRST MOTOR-SIDE VIBRATION SENSOR | DETECTED |
| SECOND MOTOR-SIDE VIBRATION SENSOR | DETECTED |

PUMP APPARATUS, TEST OPERATION METHOD OF PUMP APPARATUS, MOTOR ASSEMBLY AND METHOD FOR IDENTIFYING ABNORMAL VIBRATION OF MOTOR ASSEMBLY

CROSS REFERENCE TO RELATED APPLICATIONS

This document claims priorities to Japanese Patent Application Number 2017-253422 filed Dec. 28, 2017, Japanese Patent Application Number 2017-253423 filed Dec. 28, 2017 and Japanese Patent Application Number 2017-253424 filed Dec. 28, 2017, the entire contents of which are hereby incorporated by reference.

BACKGROUND

An electric motor assembly is known which integrally includes an electric motor as a driving machine for a rotating machine such as a pump, and an inverter as a speed changing means for the electric motor. The drive shaft of an electric motor in such an electric motor assembly is a rotating body that rotates at a high speed. There is fear that a vibration of a rotating machine is transmitted via the drive shaft to components of the electric motor assembly including an inverter.

An electric motor assembly is an apparatus which can be applied to an apparatus (e.g. a water feed pump) that supports a lifeline. If an abnormal vibration occurs in a pump apparatus comprising a combination of an electric motor assembly and a pump, the pump cannot be operated in the worst case, which may cause problems such as water failure, overflow of discharging water, etc. that exert a serious effect on the living environment. Therefore, taking measures against vibration of such a pump apparatus is of importance.

An inverter includes various electronic parts. For example, an inverter includes parts, such as an electrolytic capacitor, whose gravity center positions are low and which are susceptible to the influence of vibration. Therefore, when such an inverter is subjected to the influence of an abnormal vibration, the inverter can be damaged, which may affect the operation of a rotating machine.

Vibration which occurs in an electric motor assembly is influenced by the installation environment and the usage conditions of the electric motor assembly. Especially in a pump apparatus, vibration that occurs varies depending also on mechanical/electrical factors such as the bore and the output of the pump, the pump head, the flow rate, and on the usage environment including the type of the liquid being transferred. A determination as to whether to stop a rotating machine due to an abnormal vibration depends on the apparatus construction and the usage environment of the electric motor assembly: the operation of the rotating machine may sometimes be stopped even when the vibration is small, and may sometimes be continued as long as possible despite the vibration.

In view of this, detection of an abnormal vibration of a pump apparatus is determined based on a predetermined threshold value. The threshold value is a value which serves as a benchmark for an abnormal vibration of the pump apparatus, and is also used in a determination as to whether to stop the operation of the pump. Therefore, the electric motor assembly can accept a variety of pumps and usage environments by determining the threshold value with high accuracy and more accurately determining the occurrence of an abnormal vibration.

SUMMARY OF THE INVENTION

According to embodiments, there are provided a pump apparatus and a test operation method which can more accurately determine the occurrence of an abnormal vibration.

In order to determine whether to stop a rotating machine due to an abnormal vibration, it is necessary to identify a component of an electric motor assembly in which an abnormality has occurred. When the electric motor assembly is stopped due to the cause of an abnormal vibration, it is necessary to identify a component of the electric motor assembly in which an abnormality has occurred, and to promptly take a measure, such as replacement of a part, to eliminate the abnormal vibration.

According to embodiments, there are provided an electric motor assembly which can identify an abnormal vibration of a component, a pump apparatus including the electric motor assembly, and a method for identifying an abnormal vibration of a component of the electric motor assembly.

According to embodiments, there are provided an electric motor assembly which can continue its operation as long as possible, and a pump apparatus including the electric motor assembly.

The below-described embodiments relate to a pump apparatus and a method for test-operating a pump apparatus.

The below-described embodiments relate to an electric motor assembly, a pump apparatus, and a method for identifying an abnormal vibration of an electric motor assembly.

The below-described embodiments relate to an electric motor assembly and a pump apparatus including the electric motor assembly.

In one embodiment, a pump apparatus comprises: a pump; an electric motor for driving the pump; an inverter as a speed changing means for the electric motor; a vibration detector for detecting at least one of a vibration of the pump, a vibration of the electric motor and a vibration of the inverter; and a controller for controlling the pump, wherein the controller comprises a storage unit for storing a measured vibration value measured by the vibration detector, the storage unit having a storage table which, when the rotational speed of the pump is increased stepwise to a predetermined rotational speed, stores the measured vibration value measured at each step.

According to this embodiment, by storing measured vibration values in the storage unit, the controller can more accurately determine the occurrence of an abnormal vibration according to individual differences among pump apparatuses, the installation environment, etc.

In a preferred embodiment, the controller comprises a test operation mode for increasing the rotational speed of the pump stepwise to a predetermined rotational speed, and storing the measured vibration value measured at each step.

According to this embodiment, the controller performs, in a test operation mode, the sequence of operations of increasing the rotational speed of the pump stepwise to a predetermined rotational speed, and storing a measured vibration value measured at each step. This enhances the convenience. Since an abnormal vibration is determined by using measured vibration values, the occurrence of the abnormal vibration can be determined more accurately.

In a preferred embodiment, an abnormal vibration of the pump is detected based on the measured vibration values stored in the storage table.

According to this embodiment, the controller determines an abnormal vibration by using vibration values measured in an actual apparatus. This can determine the occurrence of an abnormal vibration more accurately.

In a preferred embodiment, the storage unit has an abnormal vibration region for storing the condition of the pump apparatus at the time of a particular rotational speed of the pump at which excessive vibration has occurred, and the controller controls the pump in such a manner as to avoid the condition of the pump apparatus, stored in the abnormal vibration region.

According to this embodiment, the controller can prevent the vibration at the particular rotational speed.

In a preferred embodiment, the storage unit further stores a predetermined reference vibration value, and a threshold value which serves as a benchmark for an abnormal vibration of the pump, and the controller calculates a correction amount which is a difference between the measured vibration value and the reference vibration value, stored in the storage table, and corrects the threshold value based on the correction amount.

According to this embodiment, through correction of a threshold value, the controller can more accurately determine the occurrence of an abnormal vibration in the pump apparatus.

In a preferred embodiment, the controller further comprises an input/output unit for inputting a signal from a pressure detector for detecting the discharge pressure of the pump, and the controller stores in the storage unit a value of the discharge pressure at the rotational speed at each step, stored in the storage table.

According to this embodiment, the controller can associate the discharge pressure with vibration values, and can therefore identify a vibration caused by the pressure of a fluid that acts on the pump.

In a preferred embodiment, in the test operation mode, the controller increases the rotational speed of the pump stepwise to a predetermined rotational speed while keeping the discharge side of the pump shut off.

According to this embodiment, the controller can minimize influence on piping equipment.

In a preferred embodiment, in the test operation mode, the controller increases the rotational speed of the pump stepwise to a predetermined rotational speed while keeping a valve on the discharge side of the pump open so that the pump is operated at a maximum efficiency point.

According to this embodiment, the controller can obtain a measured value of vibration caused by the flow rate of a fluid being transferred by the pump apparatus.

In a preferred embodiment, the pump apparatus comprises, as the vibration detector, a first motor-side vibration sensor disposed adjacent to an inverter-side first bearing, a second motor-side vibration sensor disposed adjacent to a second bearing disposed on the opposite side of the electric motor from the first bearing, and an inverter-side vibration sensor mounted to the inverter or the internal surface of an inverter housing that houses the inverter.

According to this embodiment, the controller can identify the cause of an abnormal vibration by detecting the abnormal vibration with the plurality of vibration sensors.

In another embodiment, a test operation method of a pump apparatus including a pump; an electric motor for driving the pump; an inverter as a speed changing means for the electric motor; a vibration detector for detecting at least one of a vibration of the pump, a vibration of the electric motor and a vibration of the inverter; and a controller for controlling the rotational speed of the pump, and including a storage unit for storing a measured vibration value measured by the vibration detector, comprises increasing the rotational speed of the pump stepwise to a predetermined rotational speed while performing a shut-off operation of the pump with a valve on the discharge side of the pump fully closed, and storing the measured vibration value measured at each step in a storage table of the storage unit.

According to this embodiment, the controller can minimize influence on piping equipment and, in addition, can identify the cause of an abnormal vibration.

In yet another embodiment, a test operation method of a pump apparatus including a pump; an electric motor for driving the pump; an inverter as a speed changing means for the electric motor, a vibration detector for detecting at least one of a vibration of the pump, a vibration of the electric motor and a vibration of the inverter; and a controller for controlling the rotational speed of the pump, and including a storage unit for storing a measured vibration value measured by the vibration detector, comprises: opening a valve on the discharge side of the pump so that the pump is operated at a maximum efficiency point; and increasing the rotational speed of the pump stepwise to a predetermined rotational speed, and storing the measured vibration value measured at each step in a storage table of the storage unit.

According to this embodiment, the controller can obtain a measured value of vibration caused by the flow rate of a fluid being transferred by the pump apparatus and, in addition, can identify the cause of an abnormal vibration.

In one embodiment, a motor assembly comprises: a motor, an inverter as a speed changing means for the motor; and a controller for controlling the motor, wherein the motor assembly has a first bearing disposed on the counter-load side of the motor and which rotatably supports a drive shaft of the motor, and a second bearing disposed on the load side of the motor and which rotatably supports the drive shaft, and the motor assembly comprises a first motor-side vibration sensor for detecting a vibration of the first bearing, a second motor-side vibration sensor for detecting a vibration of the second bearing, and an inverter-side vibration sensor for detecting a vibration of the inverter, and wherein the controller detects an abnormal vibration based on values detected by the first motor-side vibration sensor, the second motor-side vibration sensor and the inverter-side vibration sensor.

According to this embodiment, the controller can identify an abnormal vibration of a component of the motor assembly.

In a preferred embodiment, the controller calculates the vibration levels of values, detected by the first motor-side vibration sensor, the second motor-side vibration sensor and the inverter-side vibration sensor, for each of varying frequency ranges, and stores the calculated vibration levels as measured vibration values in a storage unit, and the controller has at least one predetermined threshold value to be compared with at least one of the vibration levels, and when a state in which the vibration level(s) of the measured vibration value(s) is not more than the threshold value(s) is termed a first state, and a state in which the vibration level(s) of the measured vibration value(s) is more than the threshold value(s) is termed a second state, the controller detects an abnormal vibration when at least one of the vibration levels is in the second state, and identifies the cause of the abnormal vibration based on the measured vibration values.

According to this embodiment, the controller can identify the cause of an abnormal vibration of a component of the motor assembly. Therefore, the operator can quickly take a measure, such as replacement of a part, to eliminate the abnormal vibration.

In a preferred embodiment, it is determined that an abnormality has occurred in the drive shaft when the inverter-side vibration sensor is in the first state, the first motor-side vibration sensor is in the second state, and the second motor-side vibration sensor is in the second state and, in addition, an abnormal vibration detected by the first motor-side vibration sensor and an abnormal vibration detected by the second motor-side vibration sensor belong to the same frequency range.

According to this embodiment, the controller can determine that an abnormality has occurred in the drive shaft. Therefore, the operator can quickly perform replacement of the drive shaft.

In a preferred embodiment, the controller determines that an abnormality has occurred in the first bearing when the inverter-side vibration sensor is in the first state, the first motor-side vibration sensor is in the second state, and the second motor-side vibration sensor is in the first state; and the controller determines that an abnormality has occurred in the second bearing when the inverter-side vibration sensor is in the first state, the first motor-side vibration sensor is in the first state, and the second motor-side vibration sensor is in the second state.

According to this embodiment, the controller can identify an abnormality that has occurred in the first bearing and an abnormality that has occurred in the second bearing. Therefore, the operator can quickly perform replacement of a bearing in which an abnormality has occurred.

In a preferred embodiment, the controller determines that an abnormality has occurred in an inverter section including the inverter when the inverter-side vibration sensor is in the second state, the first motor-side vibration sensor is in the first state, and the second motor-side vibration sensor is in the first state.

According to this embodiment, the controller can determine that an abnormality has occurred in the inverter section.

In a preferred embodiment, the controller determines that an abnormality has occurred in a chassis of the motor assembly when the inverter-side vibration sensor is in the second state, the first motor-side vibration sensor is in the second state, and the second motor-side vibration sensor is in the second state.

According to this embodiment, the controller can determine that an abnormality has occurred in the chassis of the motor assembly, i.e. in the entirety of a motor casing and an inverter housing.

In a preferred embodiment, the controller continues the operation of the motor while issuing an alarm when the inverter-side vibration sensor is in the second state, the first motor-side vibration sensor is in the first state, and the second motor-side vibration sensor is in the first state.

According to this embodiment, the controller can continue the operation of the motor, and the operator can quickly find an abnormality in the inverter section.

In a preferred embodiment, the storage unit has a storage table which, when the rotational speed of the pump is increased stepwise to a predetermined rotational speed, stores the measured vibration value measured at each step; the controller increases the rotational speed of the pump stepwise to the predetermined rotational speed in a test operation, and stores, as a measured test vibration value, the measured vibration value measured at each step in the storage table; and the controller determines the threshold value by adding or multiplying a numerical value, which indicates a certain percentage or ratio, to or by the measured test vibration value, or by calculating one of the average value, the maximum value and the minimum value of the measured test vibration values as a representative value, and adding or multiplying a predetermined value to or by the representative value, or by calculating a correction amount which is a difference between the measured test vibration value and a predetermined reference vibration value, and determining the threshold value based on the calculated correction value.

According to this embodiment, a threshold value can be determined according to individual differences among electric motor assemblies. Further the threshold value is determined with a relatively wide width. Therefore, the controller can more securely identify the cause of an abnormal vibration of a component of the motor assembly.

In a preferred embodiment, the threshold value comprises a first threshold value and a second threshold value which is higher than the first threshold value, and the controller stops the operation of the motor when at least one of the measured vibration values of the first motor-side vibration sensor, the second motor-side vibration sensor and the inverter-side vibration sensor is more than the second threshold value.

According to this embodiment, the controller can stop the operation of the motor upon the occurrence of excessive vibration. On the other hand, if the measured vibration values are not more than the second threshold value, the controller continues the operation of the motor while detecting an abnormal vibration. Therefore, the operator can quickly find an abnormal vibration of a component of the motor assembly.

In a preferred embodiment, the motor assembly comprises a motor casing which houses the motor and which has a first bearing support that supports the first bearing, and a second bearing support that supports the second bearing; and an inverter housing which houses the inverter, and is mounted to the first bearing support, the inverter-side vibration sensor is mounted to the second bearing support, and the inverter-side vibration sensor is mounted to the inverter or the internal surface of the inverter housing.

According to this embodiment, the first motor-side vibration sensor can more securely detect an abnormal vibration of the first bearing, the second motor-side vibration sensor can more securely detect an abnormal vibration of the second bearing, and the inverter-side vibration sensor can more securely detect an abnormal vibration of the inverter section.

In a preferred embodiment, the drive shaft penetrates a through-hole of the inverter.

According to this embodiment, the influence of a vibration of the drive shaft on the inverter section can be reduced. Therefore, the controller can identify the cause of an abnormal vibration of the inverter section.

In a preferred embodiment, the controller performs a vibration-reducing operation, which involves change of the rotational speed of the motor, upon the detection of the abnormal vibration.

According to this embodiment, the controller can identify the cause of an abnormal vibration of the pump.

In another embodiment, a pump apparatus comprises a pump driven by the above-described motor assembly.

In yet another embodiment, a method for identifying an abnormal vibration of a motor assembly including a motor, and an inverter as a speed changing means for the motor, comprises identifying an abnormal vibration based on values detected by a first motor-side vibration sensor for detecting a vibration of a first bearing which rotatably supports a drive shaft of the motor, a second motor-side vibration sensor for detecting a vibration of a second bearing disposed on the opposite side of the motor from the first bearing and which rotatably supports the drive shaft, and an inverter-side vibration sensor for detecting a vibration of the inverter.

According to this embodiment, the operator can identify the cause of an abnormal vibration of a component of the motor assembly. Therefore, the operator can quickly take a measure, such as replacement of a part, to eliminate the abnormal vibration.

In a preferred embodiment, the vibration levels of the values, detected by the first motor-side vibration sensor, the second motor-side vibration sensor and the inverter-side vibration sensor, are calculated as measured vibration values for each of varying frequency ranges, and when a state in which the vibration level(s) of the measured vibration value(s) is not more than at least one predetermined threshold value, which is to be compared with at least one of the vibration levels, is termed a first state, and a state in which the vibration level(s) of the measured vibration value(s) is more than the threshold value(s) is termed a second state, an abnormal vibration is detected when at least one of the vibration levels is in the second state, and the cause of the abnormal vibration is identified based on the measured vibration values.

According to this embodiment, the operator can identify the cause of an abnormal vibration of a component of the motor assembly. Therefore, the operator can quickly take a measure, such as replacement of a part, to eliminate the abnormal vibration.

In one embodiment, a motor assembly comprises: a motor; an inverter as a speed changing means for the motor, and a controller for controlling the motor, wherein the motor assembly comprises at least one vibration detector for detecting a vibration of the second bearing, and wherein the controller performs a vibration-reducing operation, which involves change of the rotational speed of the motor, based on values of the vibration detector.

According to this embodiment, the controller can perform the vibration-reducing operation which involves change of the rotational speed of the motor. This makes it possible to continue the operation of the motor assembly as long as possible even if a vibration has occurred in a component of the motor assembly.

In a preferred embodiment, the controller calculates the vibration level of a value, detected by the vibration detector, for each of varying frequency ranges and, when a state in which the vibration level is not more than a predetermined first threshold value is termed a first state, and a state in which the vibration level is more than the first threshold value is termed a second state, the controller performs the vibration-reducing operation when at least one of the vibration levels is in the second state.

According to this embodiment, the can perform the vibration-reducing operation, which involves change of the rotational speed of the motor, based on the states of the vibration levels. This makes it possible to continue the operation of the motor assembly as long as possible even if a vibration has occurred in a component of the motor assembly.

In a preferred embodiment, the vibration-reducing operation comprises a first vibration-reducing operation which comprises changing the rotational speed of the motor to a predetermined first rotational speed and operating the motor at the rotational speed for a predetermined first period of time, and then returning the rotational speed of the motor to the original rotational speed and operating the motor at the rotational speed for a predetermined second period of time.

According to this embodiment, the change in the rotational speed of the motor can eliminate the cause of vibration. This makes it possible to continue the operation of the motor assembly as long as possible even if a vibration has occurred in a component of the motor assembly.

In a preferred embodiment, after operating the motor for the second period of time in the first vibration-reducing operation, the controller determines whether the vibration levels are in the first state and, when the vibration levels are in the first state, terminates the first vibration-reducing operation.

According to this embodiment, the controller shifts the operating state of the motor assembly to the normal operating state when the vibration levels are in the first state. This makes it possible to continue the operation of the motor assembly as long as possible even if a vibration has occurred in a component of the motor assembly.

In a preferred embodiment, after operating the motor for the second period of time in the first vibration-reducing operation, the controller determines whether the vibration level(s) is in the second state and, when the vibration level(s) is in the second state, adds 1 to a first number of times of driving which indicates the number of times of driving of the motor at the first rotational speed and, when the first number of times of driving is more than a predetermined number, performs a second vibration-reducing operation which comprises operating the motor at a second rotational speed which differs from the first rotational speed.

According to this embodiment, the controller can perform the vibration-reducing operation in two steps, namely the first vibration-reducing operation state and the second vibration-reducing operation state. This makes it possible to continue the operation of the motor assembly as long as possible.

In a preferred embodiment, after performing the second vibration-reducing operation by operating the motor at the second rotational speed for a predetermined third period of time, the controller determines whether the vibration level(s) is in the second state and, when the vibration level(s) is in the second state, adds 1 to a second number of times of driving which indicates the number of times of driving of the motor at the second rotational speed and, when the second number of times of driving is more than a predetermined number, issues an alarm.

According to this embodiment, the operator can quickly find an abnormality in the motor assembly.

In a preferred embodiment, the controller operates the motor at the second rotational speed until the alarm is reset.

According to this embodiment, the operator can quickly find an abnormality in the motor assembly and, in addition, the controller can continue the operation of the motor assembly.

In a preferred embodiment, the value of the second rotational speed is a value obtained by adding, subtracting or multiplying an arbitrary value to, from or by the value of a normal rotational speed or the value of the first rotational speed, or a value that varies depending on the second number of times of driving, or a value set based on reference vibration values at varying rotational speeds of the motor.

According to this embodiment, the value of the second rotational speed is determined with a relatively wide width. Therefore, the operation of the motor assembly can be continued as long as possible.

In a preferred embodiment, the value of the first rotational speed is a value obtained by adding, subtracting or multiplying an arbitrary value to, from or by the value of a normal rotational speed, which is the rotational speed of the motor during the normal operation of the motor assembly, or a value that varies depending on the first number of times of driving.

In a preferred embodiment, the controller stores, as an abnormal vibration region, the condition at the time of a rotational speed of the motor at which excessive vibration has occurred, and the first rotational speed avoids the abnormal vibration region.

In a preferred embodiment, the controller stores reference vibration values at varying rotational speeds, and selects one or more rotational speeds from those rotational speeds which correspond to the maximum value of the vibration levels of the reference vibration values, and the first rotational speed avoids the selected rotational speed(s).

According to the above embodiments, the operation of the motor assembly can be continued as long as possible by avoiding the rotational speed at which excessive vibration has occurred.

In a preferred embodiment, the controller has a second threshold value which is higher than the first threshold value, and when a state in which the vibration level(s) is not less than the second threshold value is termed a third state, the controller stops the motor when at least one of the vibration levels is in the third state.

According to this embodiment, the controller can stop the motor in an emergency.

In a preferred embodiment, the motor assembly comprises a motor section including the motor, and an inverter section including the inverter.

According to this embodiment, the operation of the motor assembly can be continued as long as possible even if a vibration has occurred in a component of the motor assembly.

In a preferred embodiment, the motor assembly comprises, as the vibration detector, at least one of a first motor-side vibration sensor for detecting a vibration of an inverter-side first bearing, a second motor-side vibration sensor for detecting a vibration of a second bearing disposed on the opposite side of the motor from the first bearing, and an inverter-side vibration sensor for detecting a vibration of the inverter.

According to this embodiment, the controller can identify the cause of an abnormal vibration by detecting the abnormal vibration with the plurality of vibration sensors.

In a preferred embodiment, the controller has a storage table which, when the rotational speed of the motor is increased stepwise to a predetermined rotational speed, stores the vibration level at each step as a measured vibration value; the controller increases the rotational speed of the motor stepwise to the predetermined rotational speed in a test operation, and stores, as a measured test vibration value, the measured vibration value measured at each step in the storage table; and the controller determines the first threshold value and the second threshold value by adding or multiplying a numerical value, which indicates a certain percentage or ratio, to or by the measured test vibration value, or by calculating one of the average value, the maximum value and the minimum value of the measured test vibration values as a representative value, and adding or multiplying a predetermined value to or by the representative value, or by calculating a correction amount which is a difference between the measured test vibration value and a predetermined reference vibration value, and determining the first threshold value and the second threshold value based on the calculated correction value.

According to this embodiment, the controller can determine a threshold value according to individual differences among electric motor assemblies.

In another embodiment, a pump apparatus comprises a pump driven by the above-described motor assembly.

According to this embodiment, the controller can perform the vibration-reducing operation which involves change of the rotational speed of the motor. This makes it possible to continue the operation of the motor assembly as long as possible even if a vibration has occurred in a component of the motor assembly.

In a preferred embodiment, the pump apparatus comprises as the vibration detector a pump-side vibration sensor for detecting a vibration of the pump.

According to this embodiment, the controller can identify the cause of an abnormal vibration of the pump.

The controller stores measured vibration values at varying rotational speeds in the storage unit and, by using the measured vibration values, can more accurately determine the occurrence of an abnormal vibration.

The motor assembly includes a first motor-side vibration sensor, a second motor-side vibration sensor, and an inverter-side vibration sensor. Therefore, the controller can identify the cause of an abnormal vibration of a component of the motor assembly. This enables the operator to quickly take a measure, such as replacement of a part, to eliminate the abnormal vibration.

The controller can perform the vibration-reducing operation which involves change of the rotational speed of the motor. This makes it possible to continue the operation of the motor assembly as long as possible even if a vibration has occurred in a component of the motor assembly.

BRIEF DESCRIPTION OF THE DRAWINGS

FIG. 6 is a diagram showing an example of storage tables that store measured vibration values in a storage unit;

FIG. 7 shows diagrams showing measured vibration values upon the occurrence of an abnormality in a drive shaft;

FIG. 9 is a diagram showing detection/non-detection of an abnormal vibration by a first motor-side vibration sensor, a second motor-side vibration sensor and an inverter-side vibration sensor in the case shown in FIG. 7;

FIG. 15 is a diagram showing detection/non-detection of an abnormal vibration by the first motor-side vibration sensor, the second motor-side vibration sensor and the inverter-side vibration sensor in the case shown in FIG. 13;

FIG. 16 shows diagrams showing measured vibration values upon the occurrence of an abnormality in a chassis of the electric motor assembly;

DESCRIPTION OF EMBODIMENTS

Embodiments will now be described with reference to the drawings. In the below-described drawings, the same symbols are used to refer to the same or equivalent components or elements, and a duplicate description thereof is omitted.

Embodiment 1

Figure 1:
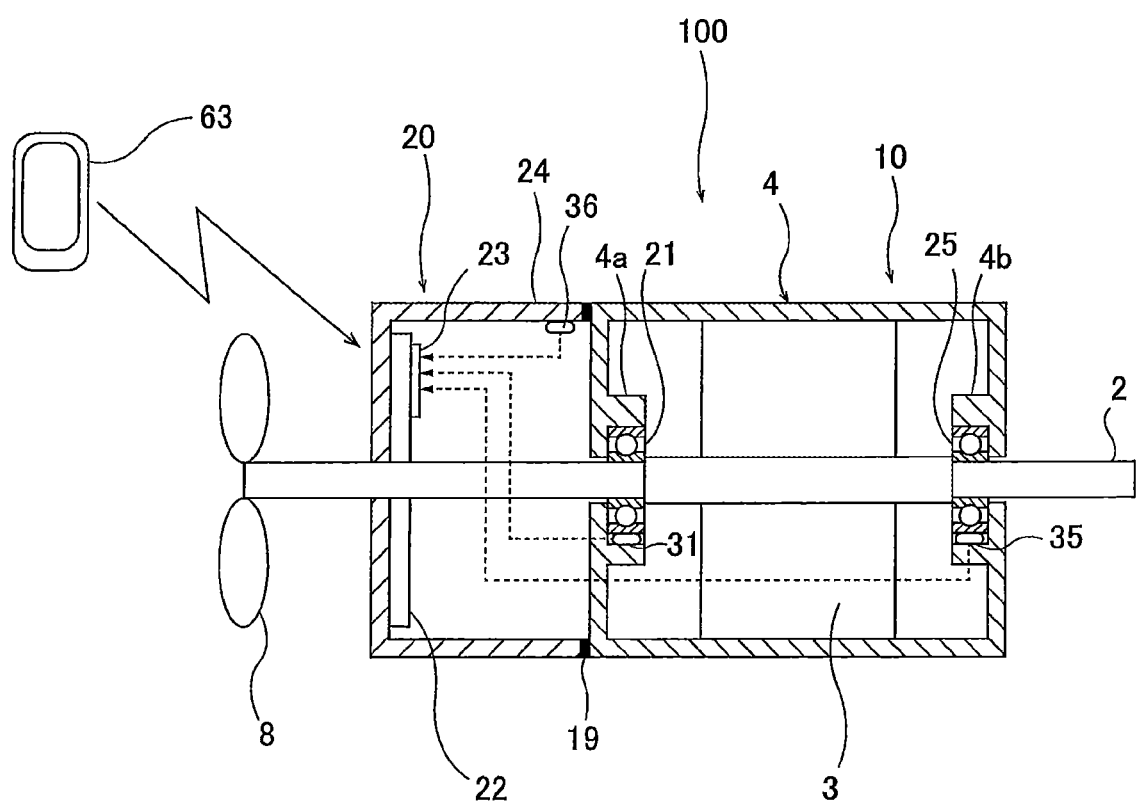
FIG. 1 is a diagram showing an embodiment of an electric motor assembly.

FIG. 1 is a diagram showing an embodiment of an electric motor assembly 100. As shown in FIG. 1, the electric motor assembly 100 includes a motor section (electric motor section) 10, and an inverter section 20 disposed adjacent to the motor section 10. The motor section 10 includes a drive shaft 2, a motor (electric motor) 3 for rotating the drive shaft 2, and a motor casing 4 that houses the motor 3. The inverter section 20 includes an inverter 22 which is a speed changing means for supplying variable-frequency AC power to the motor 3, a controller 23 for controlling the operation of the inverter 22, and an inverter housing 24 that houses the inverter 22. The controller 23 controls, via the inverter 22, the rotational speed of the motor 3 and the rotational speed of a rotating device driven by the motor 3. The inverter 22 includes a substrate, and elements such as switching elements and capacitors, mounted on the substrate. The substrate of the inverter 22 has an annular shape. The drive shaft 2 penetrates a through-hole formed in the center of the inverter 22; the inverter 22 is disposed concentrically with the drive shaft 2.

The motor casing 4 and the inverter housing 24 are connected to each other via a water seal portion 19. The water seal portion 19 is, for example, an elastic sealing member having an annular shape, and prevents intrusion of a liquid from between the motor casing 4 and the inverter housing 24.

The motor casing 4 and the inverter housing 24 are disposed concentrically with the drive shaft 2, and the drive shaft 2 penetrates a central portion of the motor casing 4 and a central portion of the inverter housing 24. The drive shaft 2 is rotatably supported by a bearing 21 and a bearing 25. Since in this embodiment the inverter housing 24 is disposed in the axial direction of the drive shaft 2, the electric motor assembly 100 can have a compact structure. The motor casing 4 and the inverter housing 24 are sometimes collectively referred to herein as the chassis of the electric motor assembly 100. As with the inverter 22, the drive shaft 2 may penetrate a through-hole (not shown) formed in the center of the inverter housing 24. In that case, the drive shaft 2 penetrates the through-hole (not shown) of the inverter housing 24 and the through-hole formed in the center of the inverter 22. Thus, the drive shaft 2 is not in contact with the inverter housing 24. This can prevent a vibration of the drive shaft 2 from being directly transmitted to the inverter 22.

The motor 3 is depicted schematically in FIG. 1. The motor 3 is, for example, a permanent magnet motor which uses a permanent magnet in a rotor. However, the motor 3 is not limited to a permanent magnet motor, and may be any of various types of motors such as an induction motor and an SR motor.

The electric motor assembly 100 further includes a cooling fan 8 secured to the drive shaft 2. The cooling fan 8 is disposed concentrically with the drive shaft 2 and located outside the inverter housing 24. When the motor 3 is driven, the driving force is transmitted to the drive shaft 2, and the cooling fan 8, secured to the drive shaft 2, rotates together with the drive shaft 2. Consequently, the cooling fan 8 sucks in surrounding air, and the sucked air flows on the exterior surfaces of the inverter housing 24 and the motor casing 4, thereby cooling the inverter section 20 and the motor section 10. The inverter section 20 is disposed between the cooling fan 8 and the motor section 10, and the cooling fan 8, the inverter section 20 and the motor section 10 are disposed linearly in this order.

In this embodiment, the peripheral wall portion of the inverter housing 24 has a cylindrical shape in conformity with the external shape of the motor casing 4. In one embodiment, when the inverter housing 24 has a special external shape due to a member such as a fin or a terminal housing, the inverter housing 24 may have a structure in conformity with the shape of the motor casing 4.

The drive shaft 2 is considered as the main source of vibration of the electric motor assembly 100. For example, when an abnormality occurs in the bearing 21 or 25, due to the progress of its wear, during operation of the motor 3, a change is often produced in the vibration of the drive shaft 2. Further, vibration of a rotating device connected to the drive shaft 2 is transmitted through the drive shaft 2. Therefore, the controller 23 preferably measures vibration of the bearings 21, 25 which support the drive shaft 2. The electric motor assembly 100 therefore includes a first motor-side vibration sensor 31 disposed adjacent to the inverter 22-side bearing 21, and a second motor-side vibration sensor 35 disposed adjacent to the bearing 25 on the not-shown loading side. Each of the first motor-side vibration sensor 31 and the second motor-side vibration sensor 35 is electrically connected to the controller 23 via a signal line, and detects a vibration of the drive shaft 2 and a vibration of the motor section 10.

The bearing 21 is disposed adjacent to the inverter section 20 and on the counter-load side of the motor 3, while the bearing 25 is disposed on the opposite side of the motor 3 from the bearing 21 (i.e. on the load side of the motor 3). The bearing 21 is supported by a bearing support 4a of the motor casing 4, while the bearing 25 is supported by a bearing support 4b of the motor casing 4. The first motor-side vibration sensor 31 is mounted to the bearing support 4a, while the second motor-side vibration sensor 35 is mounted to the bearing support 4b.

The bearings 21, 25 are consumable parts which are to be replaced periodically and have a replaceable structure. Therefore, the first motor-side vibration sensor 31 and the second motor-side vibration sensor 35 are preferably disposed at positions where they do not interfere with replacement of the bearings 21, 25. In one embodiment, a groove (not shown) may be formed in the inner surface (surface in contact with the bearing 21) of the bearing support 4a, and the bearing 21 may be disposed in the groove. Similarly, a groove (not shown) may be formed in the inner surface (surface in contact with the bearing 25) of the bearing support 4b, and the bearing 25 may be disposed in the groove.

Each of the first motor-side vibration sensor 31 and the second motor-side vibration sensor 35 may have such a replaceable structure as to enable its replacement without detachment/attachment of the bearing 21, 25. In one embodiment, each of the first motor-side vibration sensor 31 and the second motor-side vibration sensor 35 may be detachably connected to the signal line.

Vibration values, detected by the first motor-side vibration sensor 31 and the second motor-side vibration sensor 35, are inputted into the controller 23. In order not to interfere with the operation of the motor 3 and/or the installation (vertical or horizontal installation) of the electric motor assembly 100, the signal lines for the first motor-side vibration sensor 31 and the second motor-side vibration sensor 35 may be disposed, for example, along the chassis of the electric motor assembly 100 and connected to the controller 23. Connecting lines, including a power line, connecting the motor 3 and the inverter 22 may extend inside the motor casing 4 and the inverter housing 24 so as to avoid exposure of the connecting lines on the outside of the electric motor assembly 100.

In order to detect vibration of the inverter section 20, more specifically vibration in the inverter 22 or the inverter housing 24, the electric motor assembly 100 includes an inverter-side vibration sensor 36 disposed in the inverter section 20. In this embodiment, the inverter-side vibration sensor 36 is mounted to the internal surface of the inverter housing 24 in order to maintain the air-tightness (and water-tightness) of the inverter housing 24. Since the inverter-side vibration sensor 36 is disposed at a position distant from the drive shaft 2 which is a source of vibration, it can measure vibration caused by the inverter 22 (e.g. resonance of a not-shown part of the inverter 22, such as an electrolytic capacitor, whose gravity center position is low). In one embodiment, the inverter-side vibration sensor 36 may be mounted to the inverter 22. In that case, the inverter-side vibration sensor 36 may be disposed at a position distant from the drive shaft 2, in particular in a peripheral portion of the inverter 22. A vibration-proof pad, comprised of an elastic body such as rubber, may be used as the water seal portion 19. This enables the inverter housing 24 to further reduce the influence of vibration of the drive shaft 2. The inverter-side vibration sensor 36 is electrically connected to the controller 23 via a signal line, and detects a vibration of the inverter 22.

In this embodiment, the electric motor assembly 100 has the first motor-side vibration sensor 31, the second motor-side vibration sensor 35 and the inverter-side vibration sensor 36. A variety of sensors for detecting, for example, acceleration, speed, displacement, etc. may be used, either singly or in combination of two or more, as the vibration sensors. The number of the vibration sensors and their locations are not limited to those of this embodiment. When there is a member, other than the drive shaft 2 and the inverter 22, which can be a source of vibration and whose vibration needs to be particularly detected, a sensor for detecting a vibration of the member may be used additionally.

Figure 2:
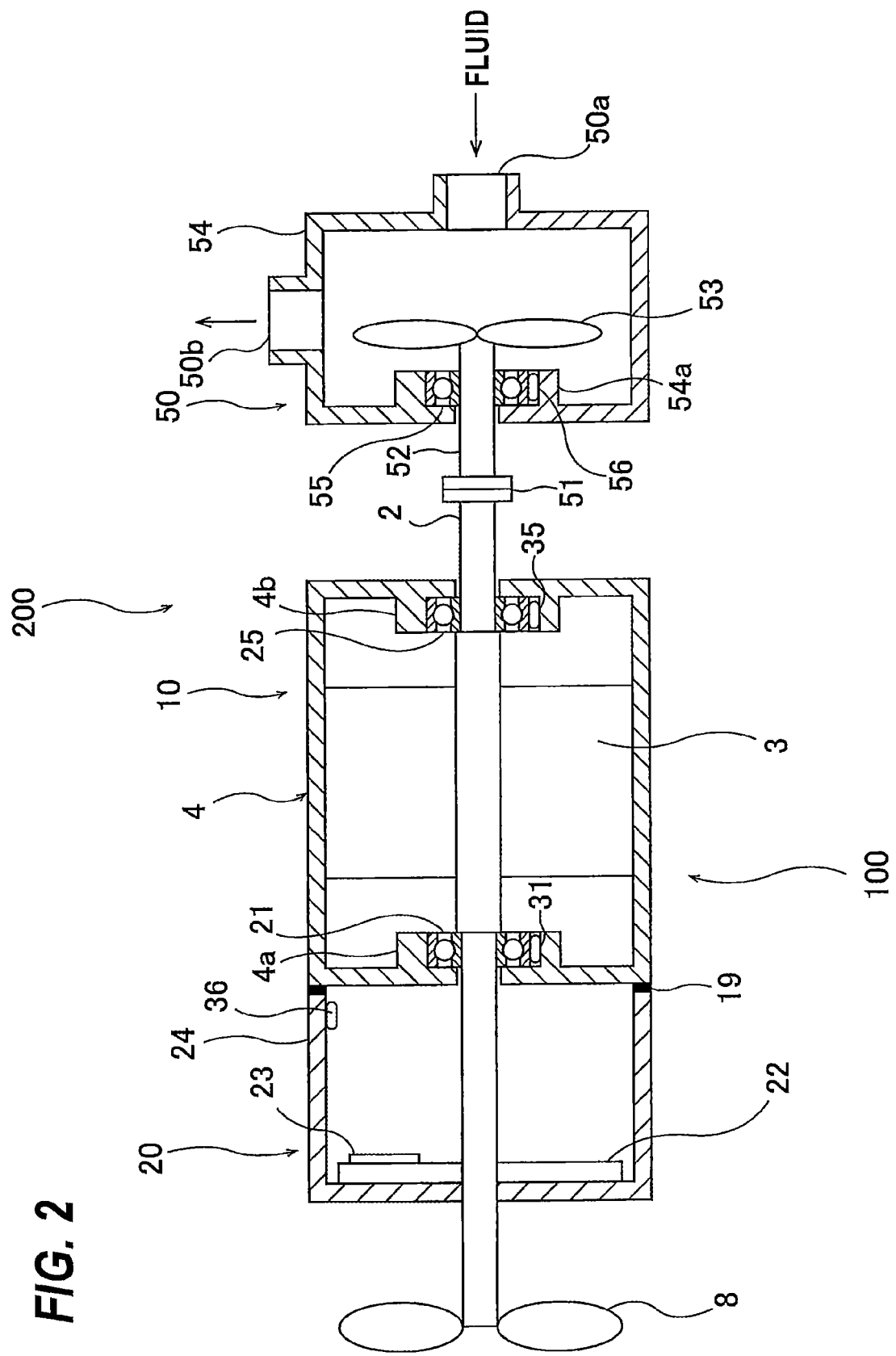
FIG. 2 is a cross-sectional view schematically showing a pump apparatus including an electric motor assembly and a pump.

FIG. 2 is a cross-sectional view schematically showing a pump apparatus 200 including the electric motor assembly 100, and a rotating device, such as a pump 50, disposed on the load side of the electric motor assembly 100. As shown in FIG. 2, the pump 50 is, for example, a centrifugal pump which includes an impeller 53 secured to a rotating shaft 52, and a pump casing 54 that houses the impeller 53. The pump 50 pressurizes a fluid that has flowed into it from a suction opening 50a and discharges the fluid through a discharge opening 50b. The pump apparatus 200 includes the rotating shaft 52 coupled to the drive shaft 2 via a coupling 51, and a bearing 55 that rotatably supports the rotating shaft 52 from the pump casing 54. The bearing 55 is supported by a bearing support 54a of the pump casing 54.

In this embodiment, the rotating shaft 52 can also be a source of vibration. Pulsation of a fluid being transferred by the pump 50 is transmitted to the rotating shaft 52. Further, when foreign matter exists in the fluid being transferred, the foreign matter may hit the impeller 53, and the vibration generated may be transmitted to the rotating shaft 52. Further, vibration of the rotating shaft 52 changes with the progress of wear of the bearing 55. Therefore, a pump-side vibration sensor 56 is mounted to the bearing support 54a that supports the bearing 55. The pump-side vibration sensor 56 is electrically connected to the controller 23, and disposed in a groove formed in the inner surface (surface in contact with the bearing 55) of the bearing support 54a. The pump-side vibration sensor 56 is electrically connected to the controller 23 via a signal line, and detects a vibration of the pump 50.

The electric motor assembly 100 according to this embodiment can be applied to a variety of pumps as long as they are dimensionally interchangeable. Connection between the electric motor assembly 100 according to this embodiment and the rotating shaft 52, which is a drive shaft for the pump 50, is not influenced by the presence/absence of a coupling and/or the installation condition (e.g. vertical or horizontal installation). For example, the electric motor assembly 100 and the pump 50 may be of the close-coupled type: the drive shaft 2 extends into the pump casing 54, and the impeller 53 is secured to the drive shaft 2. The pump 50 may be either a vertical pump or a horizontal pump, and the impeller 53 may be either a single-stage impeller or a multi-stage impeller. In this embodiment, the pump apparatus 200 shown in FIG. 2 is described as a water feed pump apparatus 200 installed on land; however, the application of the pump apparatus 200 is not limited to that of this embodiment. For example, the pump apparatus 200 may be a submersible pump apparatus installed in water, or a vacuum pump apparatus which creates a vacuum. The application of the pump apparatus 200 may vary depending on the usage environment, etc.

Figure 3:
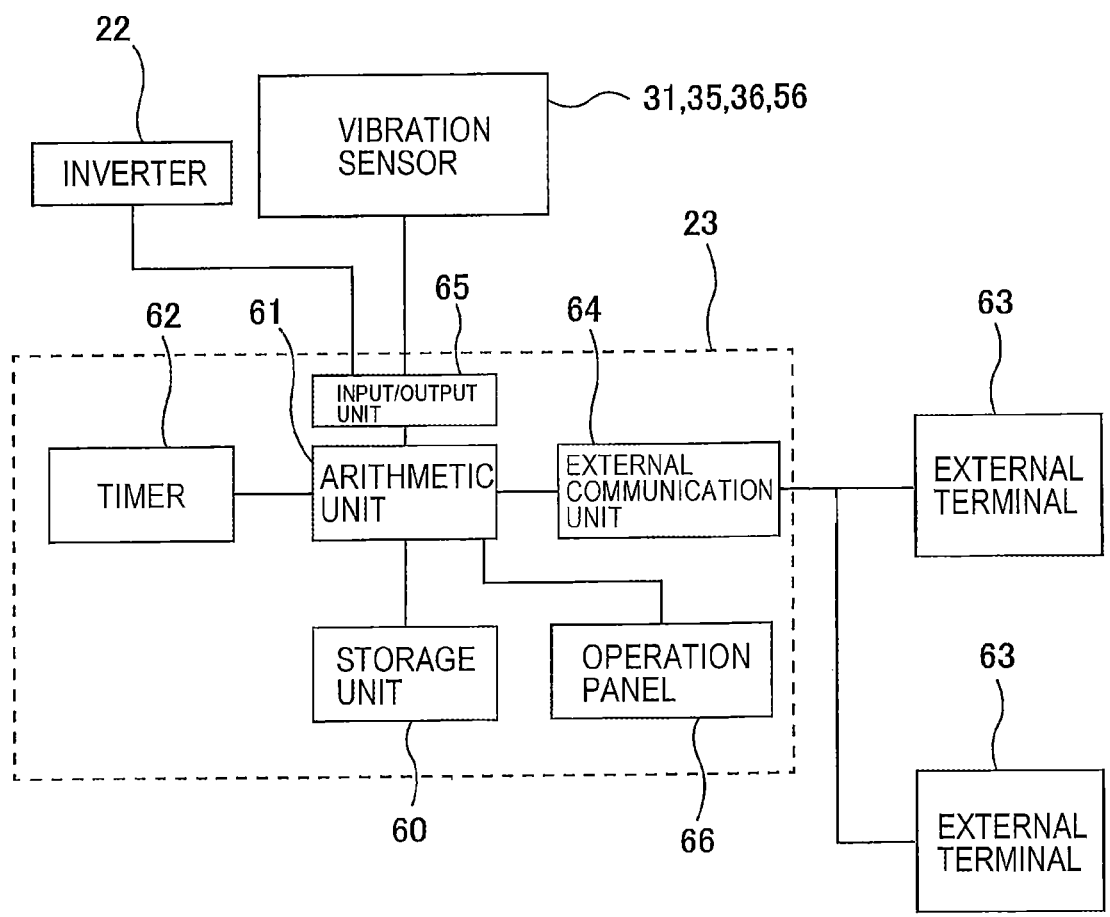
FIG. 3 is a schematic diagram showing the construction of a controller.

FIG. 3 is a schematic diagram showing the construction of the controller 23. As shown in FIG. 3, the controller 23 includes a storage unit 60 which stores various control programs and various data, an arithmetic unit 61 for performing arithmetic processing according to the control programs stored in the storage unit 60, a timer 62 connected to the arithmetic unit 61, an external communication unit 64 capable of communicating with an external terminal 63, and an input/output unit 65 for inputting/outputting signals. The controller 23 may also include an operation panel 66 capable of displaying the state of the pump apparatus 200 and performing various operations.

A non-volatile memory such as ROM, HDD, EEPROM, FeRAM, or flash memory, and a volatile memory such as RAM, can be used as the storage unit 60. The storage unit 60 stores control programs for controlling operations of the pump apparatus 200, such as automatic operation, manual operation, and the below-described test operation of the pump 50, and various data concerning the pump apparatus 200, such as apparatus information, set value information, maintenance information, history information, abnormality information, and operation information. The storage unit 60 also stores measured vibration values, measured by the first motor-side vibration sensor 31, the second motor-side vibration sensor 35, the inverter-side vibration sensor 36 and the pump-side vibration sensor 56, the particulars of which will be descried later, predetermined reference vibration values, and threshold values which serve as a benchmark for an abnormal vibration of the pump apparatus 200.

A CPU (central processing unit), for example, is used as the arithmetic unit 61. The arithmetic unit 61 performs arithmetic processing based on the control programs and the various information stored in the storage unit 60. The arithmetic unit 61 performs a Fourier transform on a vibration (vibration data or vibration information) inputted into the input/output unit 65 from the first motor-side vibration sensor 31, the second motor-side vibration sensor 35, the inverter-side vibration sensor 36 and the pump-side vibration sensor 56, thereby calculating vibration levels for each of varying frequency ranges, and stores the calculated values as "measured vibration values" in the storage unit 60. The arithmetic unit 61 compares the measured vibration values with a predetermined threshold value and, when at least one of the measured vibration values is more than the threshold value, determines an abnormal vibration of the pump apparatus 200. Further, the arithmetic unit 61 calculates the rotational speed of the motor 3 based on the various control programs and the various data of the storage unit 60, and inputs the calculated value into the inverter 22 via the input/output unit 65.

A ceramic oscillator or a crystal resonator or oscillator, for example, is used as the timer 62. It is also possible to use the clock of the CPU of the arithmetic unit 61 instead of the timer 62.

The external communication unit 64 can communicate with the external terminal 63. There is no particular limitation on the external terminal 63 as long as it is a terminal which can arbitrarily display and change control information, such as a dedicated controller, a PC (personal computer), or a PDA (Personal Digital Assistant), e.g. a smart phone. The controller 23 is connected to the external terminal 63 by wire communication or wireless communication.

The operation panel 66 and the external terminal 63 may be GUIs (Graphical User Interfaces) having the same function.

A port, communication, etc. may be used for the input/output unit 65 which performs input/output of various signals. Examples of input signals include detection values of the first motor-side vibration sensor 31, the second motor-side vibration sensor 35, the inverter-side vibration sensor 36 and the pump-side vibration sensor 56, and the state of the inverter 22 (voltage, electric current, abnormality, current frequency value, etc.). Examples of output signals include an operation signal, a stop signal, rotational speed, etc. for the motor 3, calculated in the arithmetic unit. Such output signals are outputted to the inverter 22 or a not-shown external output terminal. The input/output unit 65 may be capable of inputting detection signals of the below-described pressure sensor 73, pressure sensor 74 and flow rate sensor 72. The input/output unit 65 may include an external input terminal (not shown) for performing switching to a test operation mode and performing a test operation as will be described below.

The first motor-side vibration sensor 31, the second motor-side vibration sensor 35, the inverter-side vibration sensor 36 and the pump-side vibration sensor 56 may be hereinafter referred to simply as "vibration sensors" when there is no need to particularly distinguish between them. Various sensors for detecting, for example, acceleration, speed, displacement, etc. may be used, either singly or in combination of two or more, as the vibration sensors.

Figure 4:
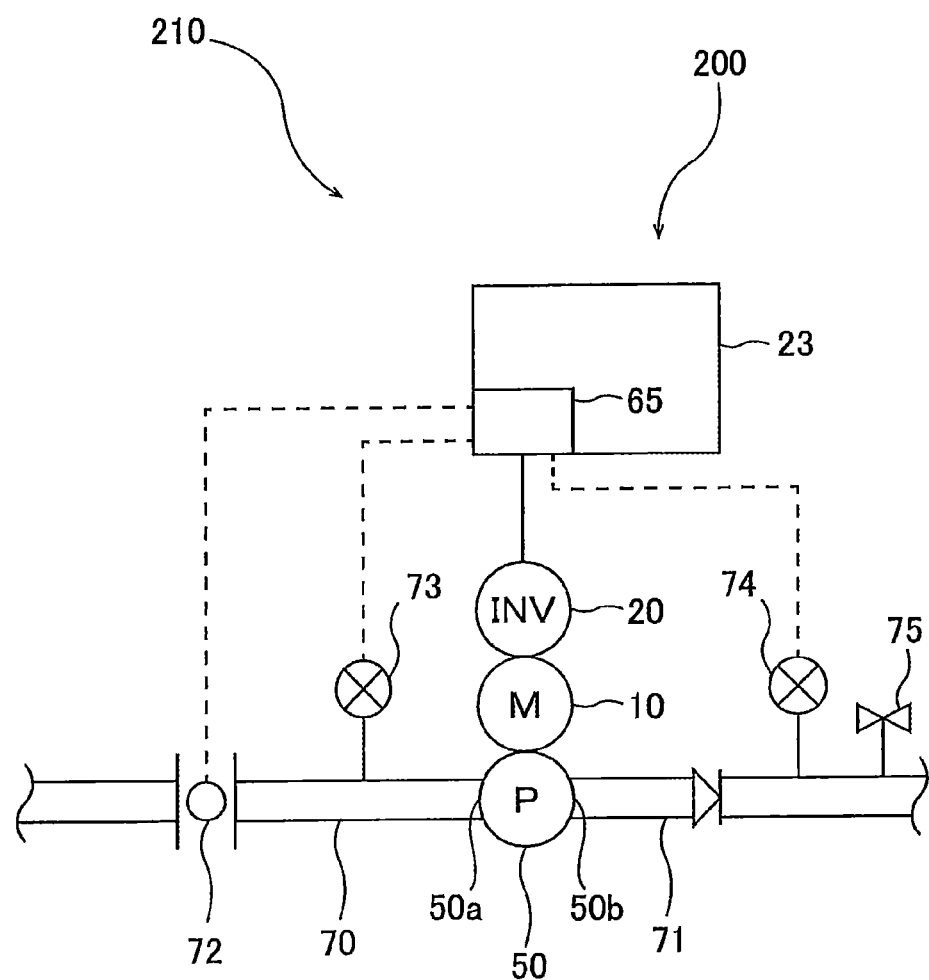
FIG. 4 is a schematic view of a pump facility provided with the pump apparatus.

FIG. 4 is a schematic view of a pump facility 210 provided with the pump apparatus 200. As shown in FIG. 4, the pump facility 210 includes an inflow pipe 70 connected to the suction opening 50a of the pump 50, a discharge pipe 71 connected to the discharge opening 50b of the pump 50, a flow rate sensor (flow rate detector) 72 for detecting the flow rate of a fluid flowing through the pump 50, a pressure sensor (pressure detector) 73 for detecting the inflow pressure of the pump 50, and a pressure sensor (pressure detector) 74 for detecting the discharge pressure of the pump 50. Further, a valve 75 for shutting off the fluid on the discharge side of the pump 50 is provided downstream of the pressure sensor (pressure detector) 74 in the discharge pipe 71.

The inflow pipe 70 is equipped with the flow rate sensor (flow rate detector) 72 for detecting the flow rate of the fluid flowing through the pump 50 and the pressure sensor (pressure detector) 73 for detecting the inflow pressure of the pump 50. The discharge pipe 71 is equipped with the pressure sensor (pressure detector) 74 for detecting the discharge-side pressure of the pump 50. The flow rate sensor 72 and the pressure sensors 73, 74 are electrically connected to the input/output unit 65 of the controller 23 so that a flow rate signal detected by the flow rate sensor 72 and a pressure signal detected by the pressure sensor 73, 74 are outputted to the input/output unit 65 of the controller 23. The controller 23 obtains a flow rate value based on the flow rate detected by the flow rate sensor 72, and obtains a pressure value based on the pressure detected by the pressure sensor 73, 74. The flow rate sensor 72, provided in the inflow pipe 70, measures the discharge flow rate of the pump 50. Instead of, or in addition to the flow rate sensor 72 provided in the inflow pipe 70, the flow rate sensor 72 may be provided in the discharge pipe 71.

The magnitude of a vibration that occurs in the pump apparatus 200 varies depending on a variety of factors including the installation environment of the pump apparatus 200, a dimension error produced in the pump apparatus 200, the output of the pump 50, the outer diameter of the impeller 53, the pump head, the flow rate, and the usage environment including the start/stop frequency of the pump. In view of this, the below-described test operation is performed, and measured vibration values of the pump apparatus 200 are stored in the storage unit 60. The measured vibration values are used to detect an abnormal vibration during pumping operation of the pump 50. For example, a threshold value, which serves as a benchmark for determining an abnormal vibration of the pump apparatus 200, is corrected by using the measured vibration values. This enables the controller 23 to more accurately determine the occurrence of an abnormal vibration of the pump apparatus 200. A method for test-operating the pump apparatus 200 will now be described.

The test operation, which is carried out in a test operation mode, may be performed, for example, at the time of factory shipment of the pump apparatus 200, after the initial installation of the pump apparatus 200 or after the completion of maintenance (e.g. replacement of a part such as a bearing) of the pump apparatus 200 when there is no failure of the pump apparatus 200 and the pump apparatus 200 can perform the normal pumping operation. More specifically, the pump apparatus 200 has not-shown test operation buttons on the external terminal 63 or the operation panel 66. Switching to the test operation mode and the test operation are performed by a user's operation of the test operation buttons, for example at the time of start-up (power-on) or restart (re-power-on) of the motor 3. The test operation mode may be interrupted with any arbitrary timing e.g. by a user's operation.

Figure 5:
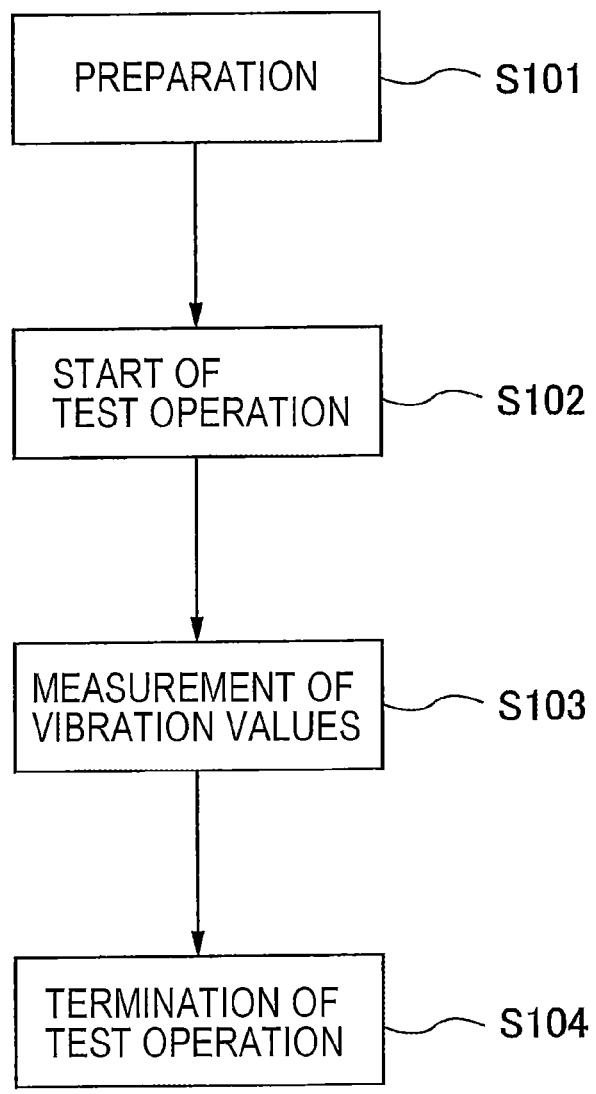
FIG. 5 is a diagram showing an operation flow chart in a test operation mode.

FIG. 5 is a diagram showing an operation flow chart in the test operation mode. First, the user makes preparations for the start of the test operation. In this embodiment, in consideration of the influence on piping equipment, the test operation is performed by the shut-off operation of the pump 50 with the valve 75 fully closed. Thus, in step S101, the user first opens the flow passage on the discharge side of the pump 50, and then fully closes the valve 75. Further, the user makes preparations, such as powering-on of the pump apparatus 200, switching to the test operation mode, etc. (see step S101 of FIG. 5). Next, the test operation of the pump apparatus 200 is started e.g. by a user's operation as a trigger (see step S102 of FIG. 5).

The controller 23 increases the rotational speed of the motor 3 to a predetermined rotational speed (e.g. a rated rotational speed) in a stepwise manner, and obtains vibration values (measured vibration values) at rotational speeds at the respective steps (see step S103 of FIG. 5). In one embodiment, the controller 23 increases the frequency of the inverter 22 from 0 Hz to a maximum frequency (e.g. 50 Hz) stepwise at 5-Hz intervals (0 Hz, 5 Hz, 10 Hz, . . . 45 Hz, 50 Hz). Alternatively, the rotational speed of the motor 3 may be increased in a stepwise manner by stepwise increasing a target pressure, and controlling the rotational speed of the motor 3 so that the discharge pressure of the pump 50 is equal to the target pressure. At a frequency at each step, a measured vibration value, obtained after waiting for a predetermined time (e.g. about 10 seconds) until the frequency and the discharge pressure become stable, is stored in the storage unit 60. A not-shown "storage button" may be provided in the controller 23 or in an external terminal, and a measured vibration value may be stored in the storage unit 60 by a user's operation of the button.

Figure 6:
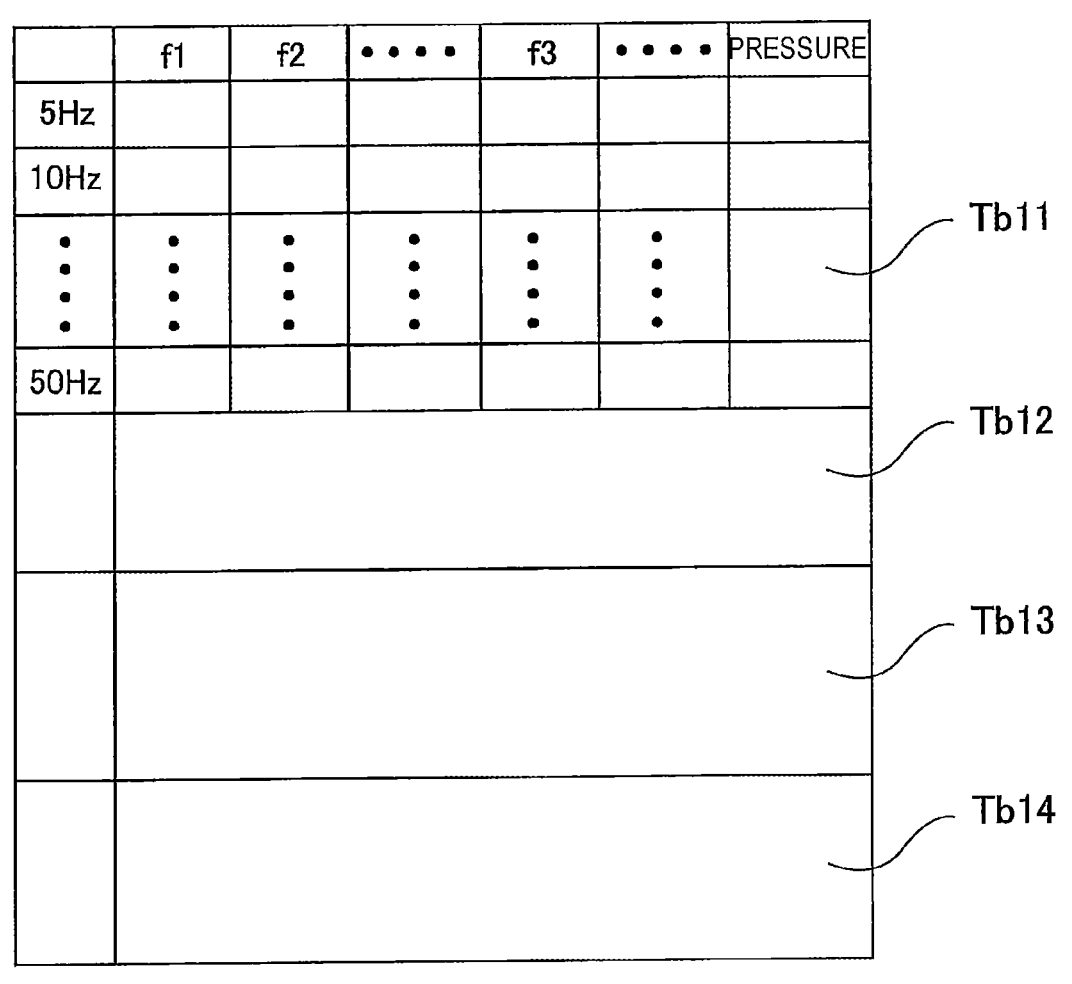

FIG. 6 is a diagram showing an example of storage tables that store measured vibration values in the storage unit 60. In this embodiment, storage tables Tb11, Tb12, Tb13 and Tb14 have the same table layout and store measured vibration values of the respective vibration sensors as measured test vibration values. In particular, during the test operation, the controller 23 stores measured vibration values of the first motor-side vibration sensor 31 in the storage table Tb11, measured vibration values of the second motor-side vibration sensor 35 in the storage table Tb12, measured vibration values of the inverter-side vibration sensor 36 in the storage table Tb13, and measured vibration values of the pump-side vibration sensor 56 in the storage table Tb14. As shown in the storage table Tb11, a vibration level for each of vibration frequency ranges (for example, f1, f2, f3 . . . fN) at a rotational speed at each step is stored in the storage unit 60. In particular, the controller 23 performs a Fourier transform on a vibration sent from each vibration sensor at a rotational speed at each step, and stores the calculated vibration level for each of the frequency ranges (for example, f1, f2, f3 . . . fN) as a measured vibration value at the corresponding frequency.

When excessive vibration has occurred at a particular rotational speed during the test operation of the pump 50, the controller 23 stores the condition of the pump apparatus 200 at that rotational speed. In particular, the storage unit 60 has an "abnormal vibration region" for storing the condition of the pump apparatus 200 at the time of a rotational speed at which excessive vibration has occurred. At least one of parameters of the condition of the pump apparatus 200, such as the rotational speed, the discharge pressure at the rotational speed, the discharge flow rate at the rotational speed, etc., is stored in the abnormal vibration region. In an automatic pumping operation of the pump apparatus 200, the controller 23 may control the pump 50 in such a manner as to avoid the condition of the "abnormal vibration region" which caused the excessive vibration. In particular, the controller 23 may control the rotational speed of the motor 3 in such a manner as to avoid the rotational speed or the discharge flow rate stored in the abnormal vibration region, or control the pump 50 in such a manner as to avoid a target pressure from being equal to the discharge pressure stored in the abnormal vibration region. This can prevent vibration at the particular rotational speed or at the particular discharge pressure. When a higher vibration than a threshold value has occurred or when a difference from a vibration value(s) at other rotational speed(s) is larger a predetermined threshold value, the controller 23 determines that excessive vibration has occurred at a particular rotational speed, and stores the condition of the pump apparatus 200 in the abnormal vibration region. In addition to or instead of the pump apparatus 200 storing the data in the "abnormal vibration region" during the test operation of the pump 50, the user may alter the "abnormal vibration region" by means of the operation panel 66 or the external terminal 63. The storage unit 60 may have one or more "abnormal vibration regions".

The controller 23 may obtain discharge pressures at rotational speeds at the respective steps during the test operation, and store the pressure data in the storage tables Tb11, Tb12, Tb13, Tb14. The controller 23 can thus associate the discharge pressures with the vibration values, and can therefore identify a vibration caused by the pressure of a fluid that acts on the pump 50. When the pump apparatus 200 is, for example, a booster pump or the like for a direct water supply equipment, whose suction pressure is subject to change, suction pressures at rotational speeds at the respective steps may be stored in the storage tables Tb11, Tb12, Tb13, Tb14. It is also possible to store pressure values each obtained by subtracting a suction pressure from the corresponding discharge pressure.

Next, upon completion of the measurement of vibration values until measurement at the predetermined rotational speed in step S103 of FIG. 5, the test operation mode is terminated e.g. by a user's operation as a trigger, thereby completing the test operation of the pump apparatus 200 (see step S104 of FIG. 5). Since the measured vibration values of the storage tables Tb11 to Tb14, stored in step S103, are vibration values of the pump apparatus 200 in the normal state, the controller 23 can detect an abnormal vibration of the pump apparatus 200 based on the measured vibration values of the storage tables Tb11 to Tb14.

By storing the measured vibration values in the storage tables Tb11 to Tb14 of the storage unit 60 in the above-described manner, the controller 23 can detect an abnormal vibration according to individual differences among pump apparatuses 200, the installation environment, etc.

Detection of an abnormal vibration during operation of the pump apparatuses 200 will now be descried. An abnormal vibration is detected, for example, when the pump 50 is pumping a fluid in an automatic manner, i.e. during operation of the motor 3. The electric motor assembly 100 of the pump apparatus 200 includes the first motor-side vibration sensor 31 and the second motor-side vibration sensor 35, disposed adjacent to the bearing 21 and the bearing 25, respectively, and the inverter-side vibration sensor 36 disposed in the inverter section 20, and can identify the cause of an abnormal vibration of a component of the electric motor assembly 100 by using a combination of abnormal vibrations detected by the vibration sensors. A method for determining an abnormality in the electric motor assembly 100, and identifying the cause of an abnormal vibration will now be described.

During operation of the motor 3 in an automatic or manual manner, the controller 23 analyzes (performs a Fourier transform on) vibrations detected by the first motor-side vibration sensor 31, the second motor-side vibration sensor 35 and the inverter-side vibration sensor 36, and stores the calculated vibration levels for each of the frequency ranges (f1, f2, f3 ... fN) as current measured vibration values in the storage unit 60. When at least one of the vibration levels of the current measured vibration values exceeds a predetermined threshold value and the vibration level(s) keeps more than the threshold value for a predetermined time, the controller 23 determines an abnormal vibration and determines that an abnormality has occurred in the electric motor assembly 100.

The threshold value for detection of an abnormal vibration is basically a vibration-level value. One or more threshold values may be pre-stored in the storage unit 60 of the controller 23. Alternatively, the controller 23 may read a threshold value as an initial value from a memory (not shown) of the external terminal 63 via the external communication unit 64. The threshold value may be either a fixed value, or a set value which can be changed by the user. Further, the threshold value may be calculated or corrected using the measured vibration values which have been stored in the storage tables Tb11 to Tb14 during the test operation.

The predetermined threshold value will now be described. The threshold value includes two-stage threshold values, namely threshold values A1, A2, A3 (first threshold values), and threshold values B1, B2, B3 (second threshold values) which are more than the threshold values A1, A2, A3 (first threshold values). The threshold values A1, B1 are to be compared with the current measured vibration values of the inverter-side vibration sensor 36. The threshold values A2, B2 are to be compared with the current measured vibration values of the first motor-side vibration sensor 31. The threshold values A3, B3 are to be compared with the current measured vibration values of the second motor-side vibration sensor 35.

In one embodiment, the threshold values A1 to A3 may be the same, while in another embodiment, the threshold values A1 to A3 may be different from each other. Likewise, the threshold values B1 to B3 may be the same in one embodiment, while in another embodiment, the threshold values B1 to B3 may be different from each other. The threshold value(s) may be determined based on the influence on the operation of the pump apparatus 200 or on the outside. For example, the threshold value(s) may vary depending on vibration that occurs when at least one of the bearings 21, 25, 55 is damaged, vibration caused by noise, vibration caused by a mechanical factor such as loss of a component of the pump apparatus and/or loosening of a screw, etc. The threshold values A1 to A3 are sometimes collectively referred to herein as the threshold value(s) A (first threshold value(s)), and the threshold values B1 to B3 are sometimes collectively referred to herein as the threshold value(s) B (second threshold value(s)).

When at least one of the current measured vibration values of the vibration sensors is not less than the threshold value(s) B (third state), the controller 23 issues an alarm indicating an abnormal vibration and stops the operation of the motor 3. When all the current measured vibration values of the vibration sensors are less than the threshold values B, and at least one of the current measured vibration values of the vibration sensors is more than the threshold value(s) A (second state), the controller 23 detects an abnormal vibration and identifies the cause of the abnormal vibration based on the measured vibration values. Further, the controller 23 issues an alarm to the operation panel 66 and the external terminal 63, and continues the operation of the motor 3. When all the current measured vibration values of the vibration sensors are not more than the threshold values A (first state), the controller 23 determines that the vibration is within the normal range, and not an abnormal vibration.

A description will now be given of an example in which the controller 23 calculates the threshold values A, B for the respective vibration sensors in consideration of the rotational speed or the discharge pressure of the pump 50, using the measured vibration values of the storage tables Tb11 to Tb13 obtained by the test operation descried above with reference to FIG. 5.

For example, the controller 23 may determine the threshold values A, B by adding or multiplying a numerical value, which indicates a certain percentage or ratio (e.g. a few percent), to or by the measured vibration values of the storage tables Tb11 to Tb13. In the case where the pump apparatus 200 performs estimated end-pressure control, a target pressure increases with increase in the flow rate (rotational speed of the pump 50), and accordingly vibration is more likely to occur in the pump apparatus. Therefore, the numerical value, which is to be added to or multiplied by the measured vibration values of the storage tables Tb11 to Tb13, may be increased with increase in the rotational speed of the pump 50. Alternatively, the controller 23 may determine the threshold values A, B by calculating one of the average value, the maximum value and the minimum value of the measured vibration values of the storage tables Tb11 to Tb14 as a representative value, and adding or multiplying a predetermined value to or by the representative value.

In another example of a method for determining the threshold values A, B using the data of the storage tables Tb11 to Tb13, the controller 23 may calculate correction amounts (correction values) which are differences between the measured vibration values of the storage tables Tb11 to Tb13 and predetermined reference vibration values, and correct the predetermined initial values of the threshold values A, B, pre-stored in the storage unit 60, based on the calculated correction amounts. The reference vibration values correspond to representative performance values in the case of operating a large number of pump apparatuses of the same design and the same model, and measured vibration values may be stored in storage tables (not shown) having the same table layout as the storage tables Tb11 to Tb13. For example, the controller 23 calculates threshold values by adding or subtracting the correction amounts to or from the predetermined threshold values A, B. The controller 23 stores the threshold values (corrected threshold values), after the correction of the initial values, as the threshold values A, B in the storage unit 60.

The timing of calculating the threshold values A, B may be when step S103 of FIG. 5 is completed, or when the operation of the pump 50 is started. The threshold values A, B may be calculated also upon a change in the reference vibration values or the initial threshold values A, B. Further, the threshold values A, B, from which the measured vibration values in the "abnormal vibration region" are excluded, may be calculated e.g. by using predetermined initial values instead of the measured vibration values of the storage tables Tb11 to Tb14 in the "abnormal vibration region". By thus determining the threshold values A, B using the measured vibration values of the storage tables Tb11 to Tb13, an abnormal vibration of the pump apparatus 200 can be detected based on the measured vibration values stored in the test operation. This makes it possible to detect an abnormal vibration according to the installation environment and use of the pump apparatus 200.

A method for detecting an abnormal vibration, and identifying the cause of the abnormal vibration of a component of the electric motor assembly 100 will now be described.

FIGS. 7, 10, 13 and 16 are diagrams showing measured vibration values upon the occurrence of an abnormality due to a certain cause. FIGS. 9, 12, 15 and 18 are diagrams showing detection/non-detection of an abnormal vibration by the first motor-side vibration sensor 31, the second motor-side vibration sensor 35 and the inverter-side vibration sensor 36. In FIG. 7, the abscissa axis represents vibration frequency ranges [Hz], and the ordinate represents vibration level [dB]. Also in the below-described FIGS. 10, 13 and 16, the abscissa axis represents vibration frequency ranges [Hz], and the ordinate represents vibration level [dB]. The diagrams (1) of FIGS. 7, 10, 13 and 16 show measured vibration values detected by the inverter-side vibration sensor 36, the diagrams (2) of FIGS. 7, 10, 13 and 16 show measured vibration values detected by the first motor-side vibration sensor 31, and the diagrams (3) of FIGS. 7, 10, 13 and 16 show measured vibration values detected by the second motor-side vibration sensor 35. FIGS. 8, 11, 14 and 17 each show a flow chart of a process for identifying the cause of an abnormal vibration of a component of the electric motor assembly 100 by means of the controller 23. The process is performed repeatedly with arbitrary timing during operation of the electric motor assembly 100. The controller 23 can preferably perform the processes of the flow charts of FIGS. 8, 11, 14 and 17 in parallel, and can simultaneously detect the causes of a plurality of abnormal vibrations.

A case in which an abnormality occurs in the drive shaft 2 will now be described, as an example of a first cause of an abnormal vibration of a component of the electric motor assembly 100, with reference to FIGS. 7, 8 and 9. FIG. 7 shows diagrams showing measured vibration values upon the occurrence of an abnormality in the drive shaft 2. When the rotating drive shaft 2 is bent or distorted, an abnormal vibration may occur in the bearings 21 and 25, which support the drive shaft 2, in approximately the same frequency range. In this case, therefore, the first motor-side vibration sensor 31 and the second motor-side vibration sensor 35 simultaneously detect an abnormal vibration, whereas the inverter-side vibration sensor 36, which is not in direct contact with the drive shaft 2, does not detect the abnormal vibration (see FIG. 9).

Figure 8:
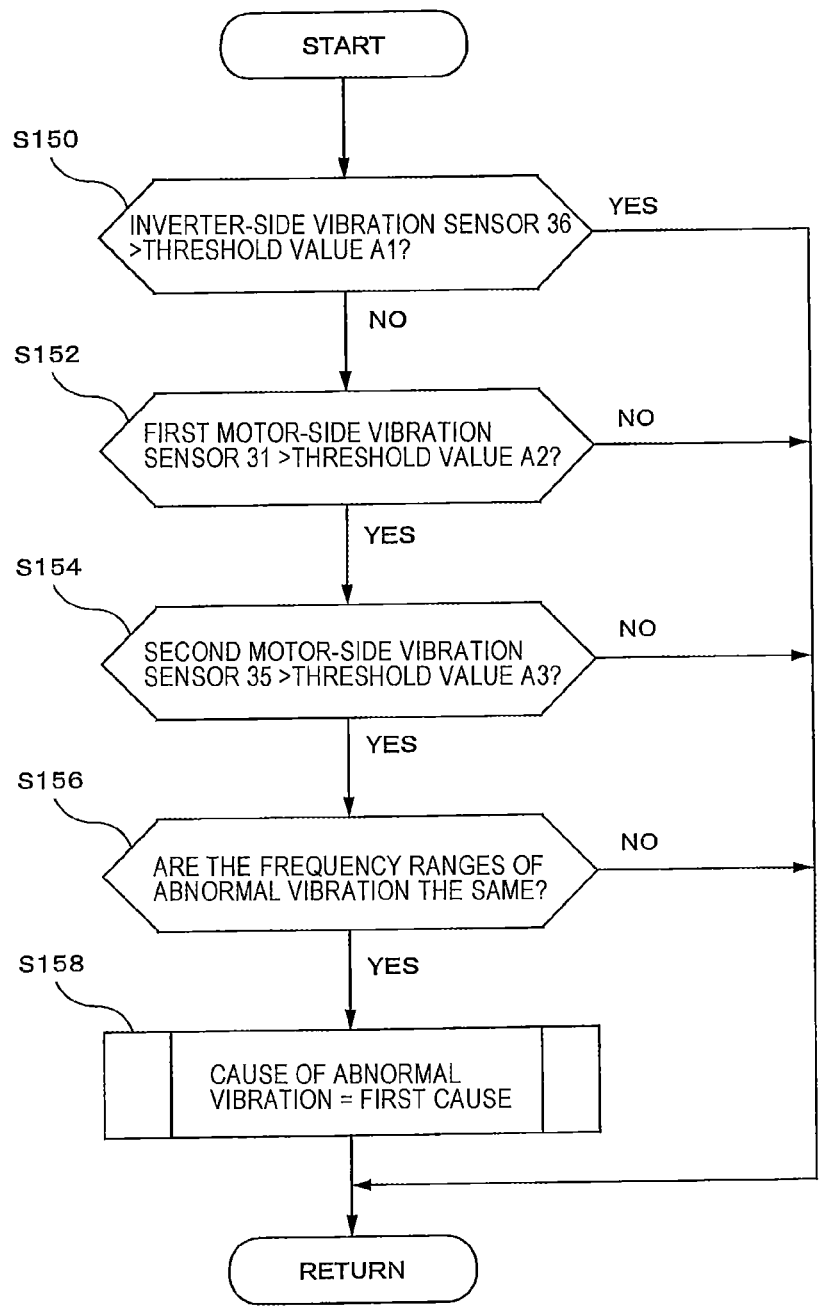
FIG. 8 is a diagram showing a flow chart of a process for identifying the cause of an abnormal vibration of a component of the electric motor assembly by means of the controller.

In particular, as shown in FIG. 8, the controller 23 compares the vibration levels of the current measured vibration values of the inverter-side vibration sensor 36 with the threshold value A1 (see step S150 of FIG. 8) and, when the vibration levels of the current measured vibration values of the inverter-side vibration sensor 36 are not more than the threshold value A1 (step S150, No), compares the vibration levels of the current measured vibration values of the first motor-side vibration sensor 31 with the threshold value A2 (see step S152 of FIG. 8). When at least one of the vibration levels of the current measured vibration values of the first motor-side vibration sensor 31 is more than the threshold value A2 (step S152, Yes), the controller 23 compares the vibration levels of the current measured vibration values of the second motor-side vibration sensor 35 with the threshold value A3 (see step S154 of FIG. 8). When at least one of the vibration levels of the current measured vibration values of the second motor-side vibration sensor 35 is more than the threshold value A3 (step S154, Yes), the controller 23 determines if the frequency ranges, in which the vibrations more than the threshold values A have been detected by the first motor-side vibration sensor 31 and the second motor-side vibration sensor 35, are the same or not (see step S156 of FIG. 8). When the controller 23 determines that the frequency ranges are the same (step S156, Yes), then the controller 23 determines that an abnormality in the drive shaft 2 is the cause of the abnormal vibration (step S158), and terminates the process of the flow chart of FIG. 8. When in step S156 the frequency ranges, in which the vibrations more than the threshold values A have occurred, are different from each other (step S156, No), the controller 23 terminates the process of the flow chart of FIG. 8 without identifying the cause of the abnormal vibration.

The controller 23 terminates the process of the flow chart of FIG. 8 without identifying the cause of the abnormal vibration when at least one of the vibration levels of the current measured vibration values of the inverter-side vibration sensor 36 is more than the threshold value A1 (step S150, Yes), when the vibration levels of the current measured vibration values of the first motor-side vibration sensor 31 are not more than the threshold value A2 (step S152, No), or when the vibration levels of the current measured vibration values of the second motor-side vibration sensor 35 are not more than the threshold value A3 (step S154, No).

As shown in FIG. 7, the controller 23 determines that an abnormality has occurred in the drive shaft 2 when one of the vibration levels of the current measured vibration values of the first motor-side vibration sensor 31 and one of the vibration levels of the current measured vibration values of the second motor-side vibration sensor 35 are not less than the threshold values A in approximately the same frequency range (f3 in this example), and when the vibration level of the current measured vibration value of the inverter-side vibration sensor 36 in the same frequency range (f3 in this example) is not more than the threshold value A.

Figure 10:
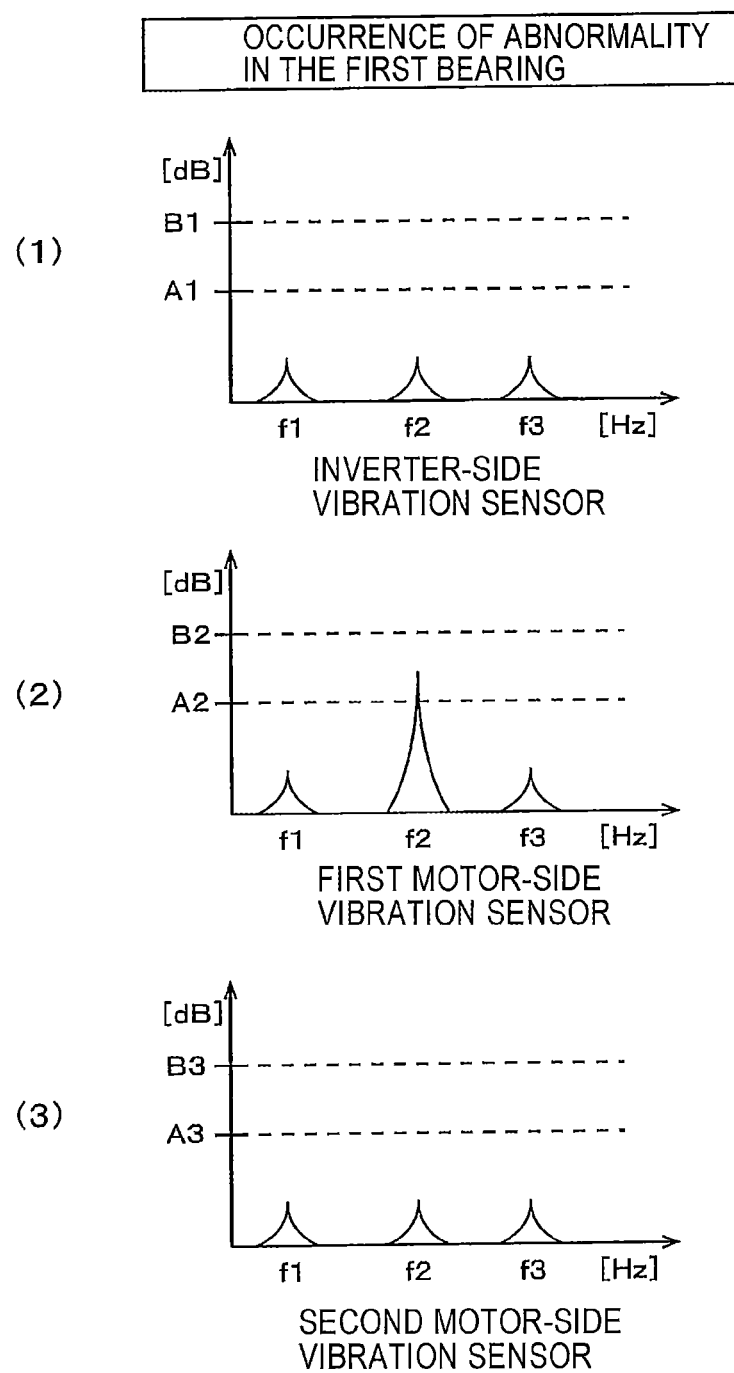
FIG. 10 shows diagrams showing measured vibration values upon the occurrence of an abnormality in a bearing.
Figures 11, 12:
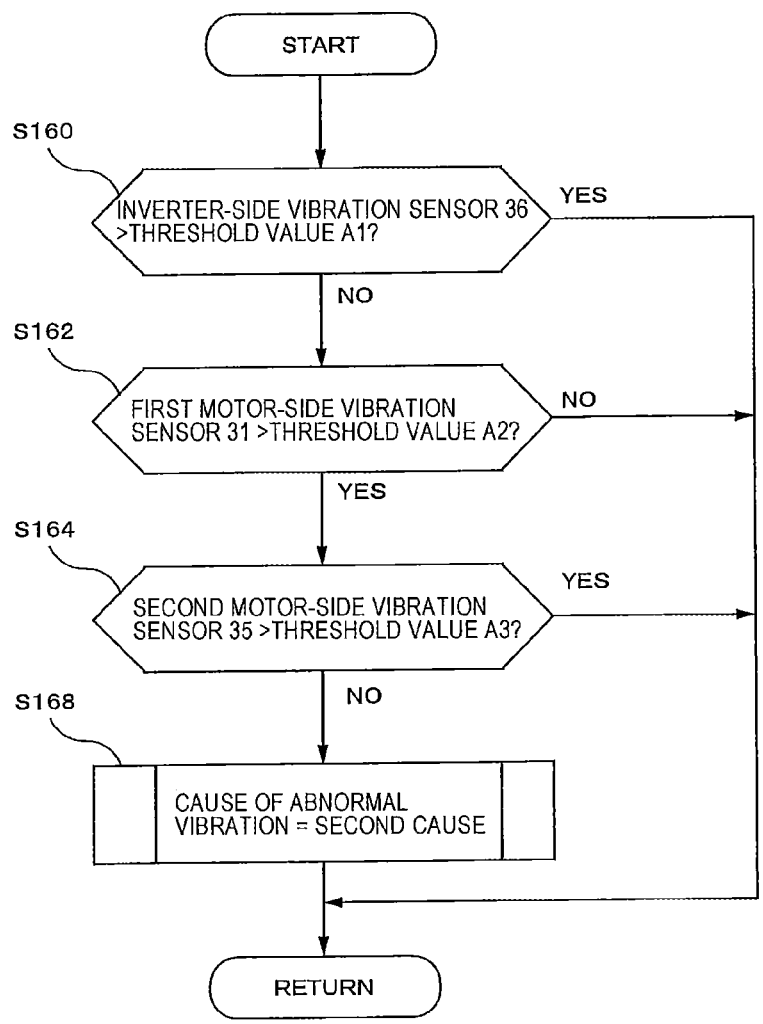
FIG. 11 is a diagram showing a flow chart of a process for identifying the cause of an abnormal vibration of a component of the electric motor assembly by means of the controller.
FIG. 12 is a diagram showing detection/non-detection of an abnormal vibration by the first motor-side vibration sensor, the second motor-side vibration sensor and the inverter-side vibration sensor in the case shown in FIG. 10.

A case in which an abnormality occurs in one of the bearings 21, 25 will now be described, as an example of a second cause of an abnormal vibration of a component of the electric motor assembly 100, with reference to FIGS. 10, 11 and 12. FIG. 10 shows diagrams showing measured vibration values upon the occurrence of an abnormality in the bearing 21. FIG. 11 is a diagram showing a flow chart of a process for identifying the cause of an abnormal vibration of a component of the electric motor assembly 100 by means of the controller 23. FIG. 12 is a diagram showing detection/non-detection of an abnormal vibration by the first motor-side vibration sensor 31, the second motor-side vibration sensor 35 and the inverter-side vibration sensor 36 in the case shown in FIG. 10.

When an abnormality (e.g. damage) has occurred in one of the bearings 21, 25, the bearing with the abnormality vibrates particularly heavily. Thus, an abnormal vibration (particular vibration) occurs only in the bearing with the abnormality. In this case, therefore, the vibration sensor, corresponding to the bearing with the abnormality, detects a vibration exceeding the threshold value A in advance of the other vibration sensors (FIG. 12).

In particular, as shown in FIG. 11, the controller 23 compares the vibration levels of the current measured vibration values of the inverter-side vibration sensor 36 with the threshold value A1 (see step S160 of FIG. 11) and, when the vibration levels of the current measured vibration values of the inverter-side vibration sensor 36 are not more than the threshold value A1 (step S160, No), compares the vibration levels of the current measured vibration values of the first motor-side vibration sensor 31 with the threshold value A2 (see step S162 of FIG. 11). When at least one of the vibration levels of the current measured vibration values of the first motor-side vibration sensor 31 is more than the threshold value A2 (step S162, Yes), the controller 23 compares the vibration levels of the current measured vibration values of the second motor-side vibration sensor 35 with the threshold value A3 (see step S164 of FIG. 11). When the vibration levels of the current measured vibration values of the second motor-side vibration sensor 35 are not more than the threshold value A3 (step S164, No), the controller 23 determines that the cause of the abnormal vibration resides in the bearing 21 (see step S168 of FIG. 11), and terminates the process of the flow chart of FIG. 11.

The controller 23 terminates the process of the flow chart without identifying the cause of the abnormal vibration when at least one of the vibration levels of the current measured vibration values of the inverter-side vibration sensor 36 are more than the threshold value A1 (step S160, Yes), when the vibration levels of the current measured vibration values of the first motor-side vibration sensor 31 are not more than the threshold value A2 (step S162, No), or when at least one of the vibration levels of the current measured vibration values of the second motor-side vibration sensor 35 is more than the threshold value A3 (step S164, Yes).

For example, if the bearing 21 is damaged and the drive shaft 2a contacts the bearing support 4a, the first motor-side vibration sensor 31 first detects a vibration level, which is higher than those detected by the other vibration sensors, in a certain frequency range (f2 in this example). Therefore, the controller 23 can determine that an abnormality has occurred in the bearing 21 when one of the vibration levels of the measured vibration values of the first motor-side vibration sensor 31 exceeds the particular threshold value A2 in the certain frequency range (f2 in this example), the vibration levels of the measured vibration values of the second motor-side vibration sensor 35 do not exceed the threshold value A3 in any frequency range, and the vibration levels of the measured vibration values of the inverter-side vibration sensor 36 do not exceed the threshold value A1 in any frequency range.

Similarly, the controller 23 can determine that an abnormality has occurred in the bearing 25 when one of the vibration levels of the measured vibration values of the second motor-side vibration sensor 35 exceeds the threshold value A3, none of the vibration levels of the measured vibration values of the first motor-side vibration sensor 31 exceed the threshold value A2, and none of the vibration levels of the measured vibration values of the inverter-side vibration sensor 36 exceed the threshold value A1.

Figure 13:
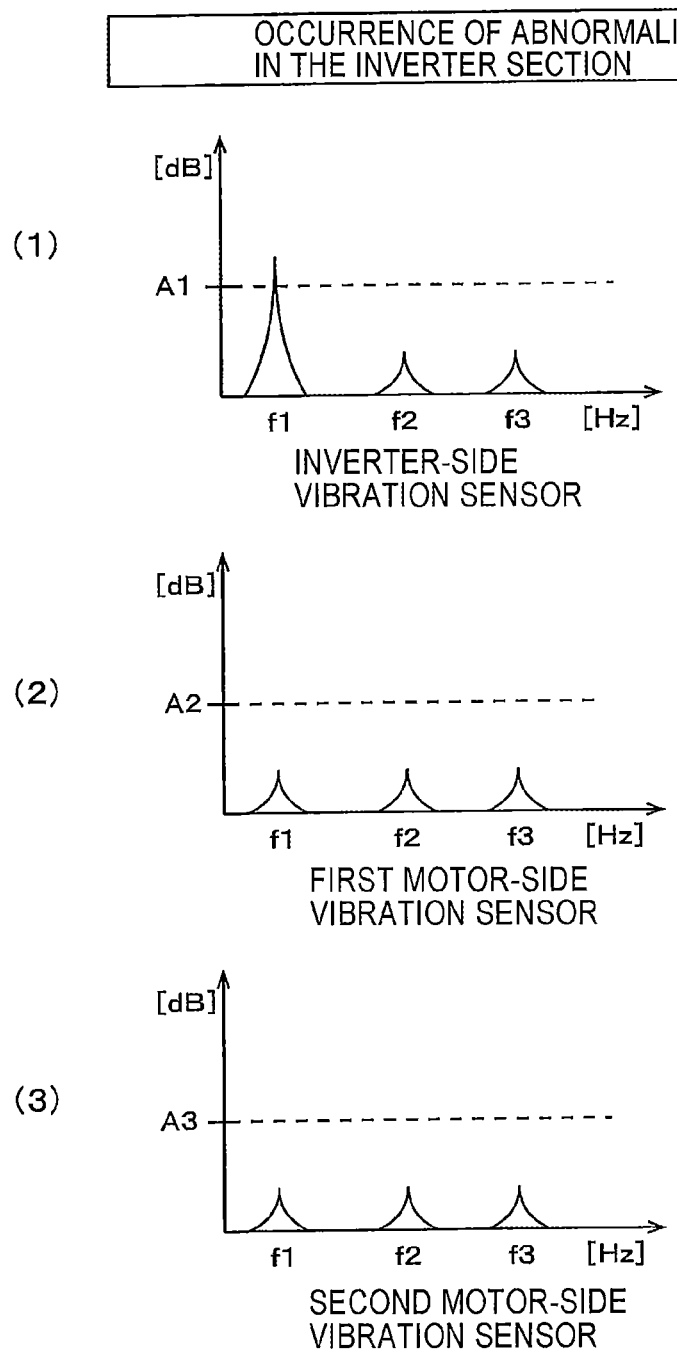
FIG. 13 shows diagrams showing measured vibration values upon the occurrence of an abnormal vibration caused by an abnormality in an inverter section.

A case in which an abnormality occurs in the inverter section 20 will now be described, as an example of a third cause of an abnormal vibration of a component of the electric motor assembly 100, with reference to FIGS. 13, 14 and 15. FIG. 13 shows diagrams showing measured vibration values upon the occurrence of an abnormal vibration due to an abnormality in the inverter section 20. FIG. 15 is a diagram showing detection/non-detection of an abnormal vibration by the first motor-side vibration sensor 31, the second motor-side vibration sensor 35 and the inverter-side vibration sensor 36 in the case shown in FIG. 13.

An abnormal vibration may occur in the inverter section 20 for causes such as instable fixing of the inverter 22 to the inverter housing 24 and/or resonance of an element of the inverter 22. In this case, the inverter-side vibration sensor 36 first detects an abnormal vibration, while neither the first motor-side vibration sensor 31 nor the second motor-side vibration sensor 35 detects the abnormal vibration (see FIG. 15).

Figure 14:
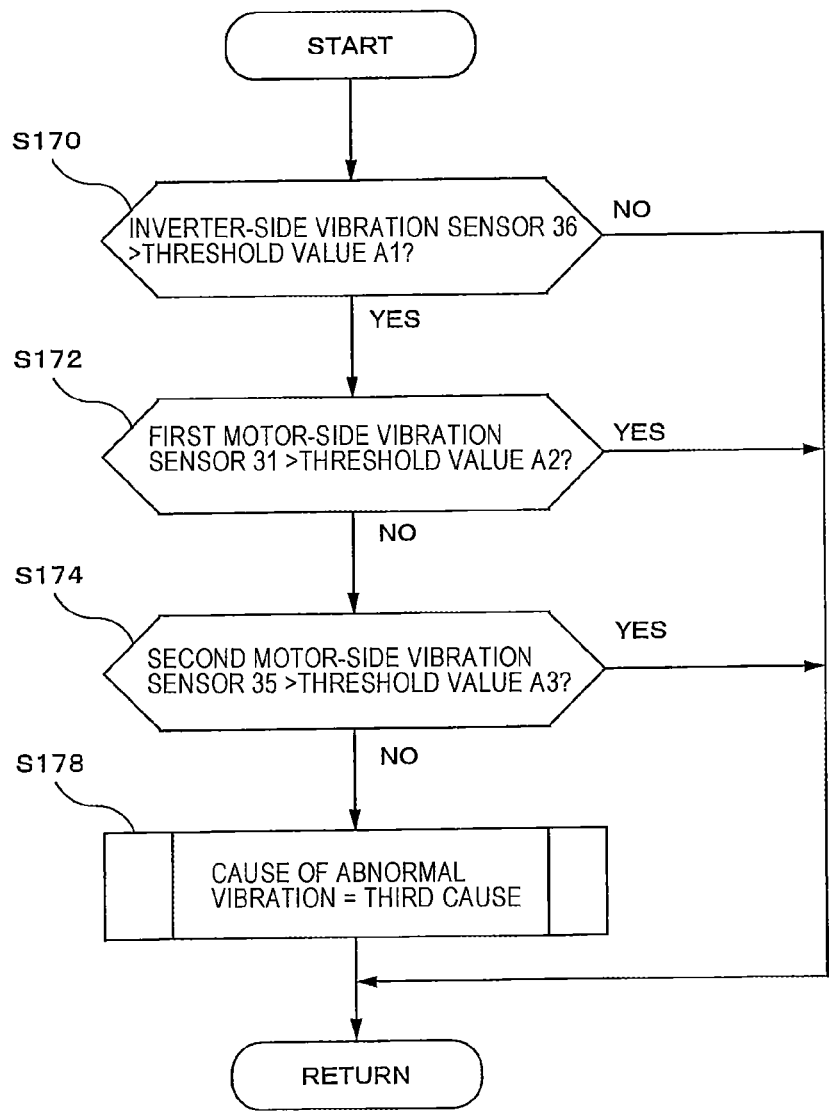
FIG. 14 is a diagram showing a flow chart of a process for identifying the cause of an abnormal vibration of a component of the electric motor assembly by means of the controller.

In particular, as shown in FIG. 14, the controller 23 compares the vibration levels of the current measured vibration values of the inverter-side vibration sensor 36 with the threshold value A1 (see step S170 of FIG. 14) and, when at least one of the vibration levels of the current measured vibration values of the inverter-side vibration sensor 36 is more than the threshold value A1 (step S170, Yes), compares the vibration levels of the current measured vibration values of the first motor-side vibration sensor 31 with the threshold value A2 (see step S172 of FIG. 14). When the vibration levels of the current measured vibration values of the first motor-side vibration sensor 31 are not more than the threshold value A2 (step S172, No), the controller 23 compares the vibration levels of the current measured vibration values of the second motor-side vibration sensor 35 with the threshold value A3 (see step S174 of FIG. 14). When the vibration levels of the current measured vibration values of the second motor-side vibration sensor 35 are not more than the threshold value A3 (step S174, No), the controller 23 determines that the cause of the abnormal vibration resides in the inverter section 20 (step S178), and terminates the process of the flow chart of FIG. 14.

The controller 23 terminates the process of the flow chart of FIG. 14 without identifying the cause of the abnormal vibration when the vibration levels of the current measured vibration values of the inverter-side vibration sensor 36 are not more than the threshold value A1 (step S170, No), when at least one of the vibration levels of the current measured vibration values of the first motor-side vibration sensor 31 is more than the threshold value A2 (step S172, Yes), or when at least one of the vibration levels of the current measured vibration values of the second motor-side vibration sensor 35 is more than the threshold value A3 (step S174, Yes).

The controller 23 determines that the cause of the abnormal vibration resides in the inverter section 20 when one of the vibration levels of the measured vibration values of the inverter-side vibration sensor 36 exceeds the particular threshold value A1 in a certain frequency range (f1 in this example), the vibration levels of the measured vibration values of the first motor-side vibration sensor 31 do not exceed the threshold value A2 in any frequency range, and the vibration levels of the measured vibration values of the second motor-side vibration sensor 35 do not exceed the threshold value A3 in any frequency range.

As shown in FIG. 13, when the inverter-side vibration sensor 36 detects an abnormal vibration, and the first motor-side vibration sensor 31 and the second motor-side vibration sensor 35 do not detect the abnormal vibration, the controller 23 can determine the occurrence of an abnormality in the inverter section 20 based only on the threshold values A1 to A3. In this case, after the controller 23 determines the occurrence of an abnormality in the inverter section 20, the controller 23 can continue the operation of the electric motor assembly 100 while issuing an alarm. In some cases, the pump apparatus 200 is used as a lifeline such as a feed or drainage pump apparatus. In such a case, it is preferred to continue the operation of the pump 50 until the supply of power to the motor 3 becomes impossible, for example, due to a fall of an element of the inverter 20, caused by excessive vibration.

A case in which an abnormality occurs in the motor casing 4 and the inverter housing 24 (the chassis of the electric motor assembly 100) will now be described, as an example of a fourth cause of an abnormal vibration of a component of the electric motor assembly 100, with reference to FIGS. 16, 17 and 18. FIG. 16 shows diagrams showing measured vibration values upon the occurrence of an abnormal vibration in the chassis of the electric motor assembly 100. FIG. 18 is a diagram showing detection/non-detection of an abnormal vibration by the first motor-side vibration sensor 31, the second motor-side vibration sensor 35 and the inverter-side vibration sensor 36 in the case shown in FIG. 16.

In the event of the occurrence of an abnormality (e.g. noise) in the chassis of the electric motor assembly 100 for causes such as instable installation of the electric motor assembly 100, the abnormality may cause an abnormal vibration of the motor casing 4 and the inverter housing 24. In this case, therefore, the first motor-side vibration sensor 31, the second motor-side vibration sensor 35 and the inverter-side vibration sensor 36 all detect the abnormal vibration simultaneously (see FIG. 18).

Figure 17:
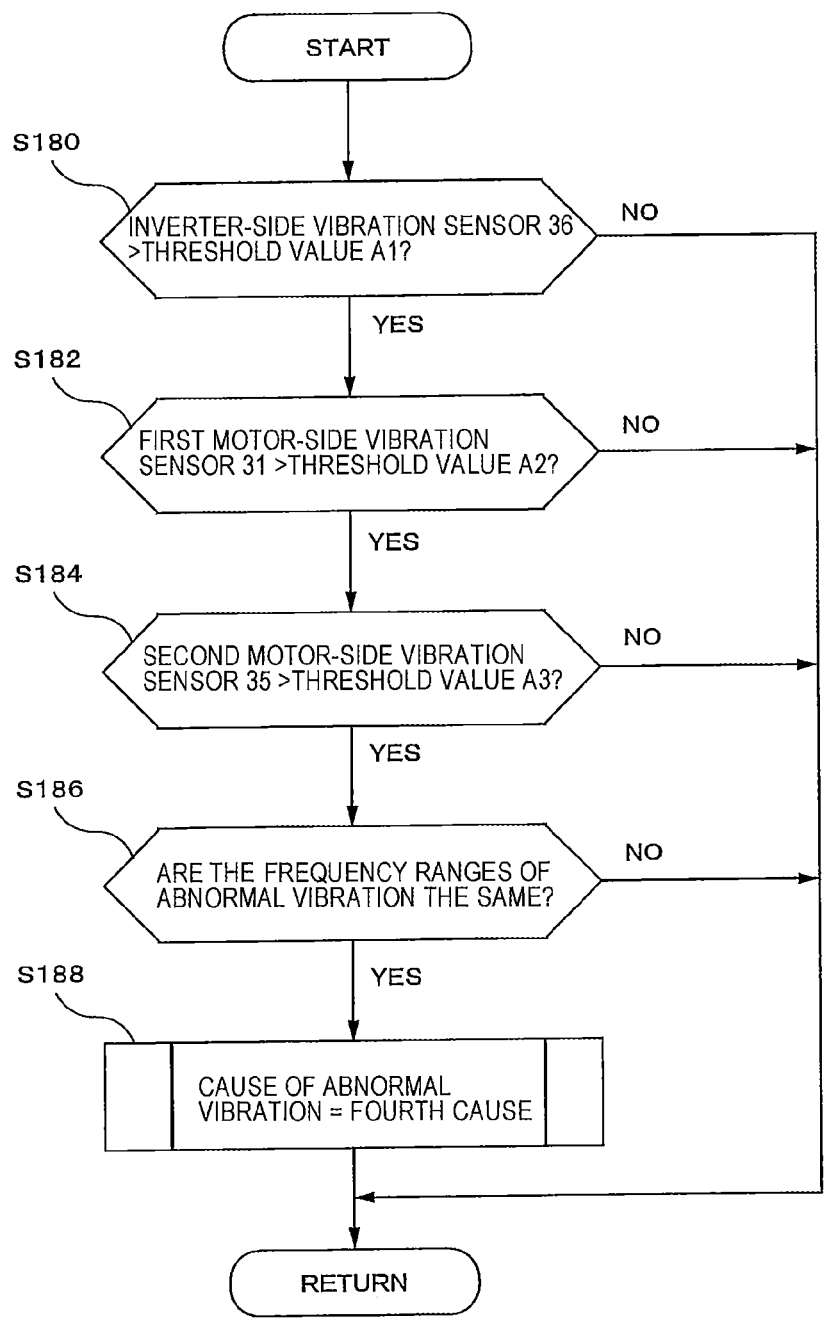
FIG. 17 is a diagram showing a flow chart of a process for identifying the cause of an abnormal vibration of a component of the electric motor assembly by means of the controller.
Figures 18, 19:
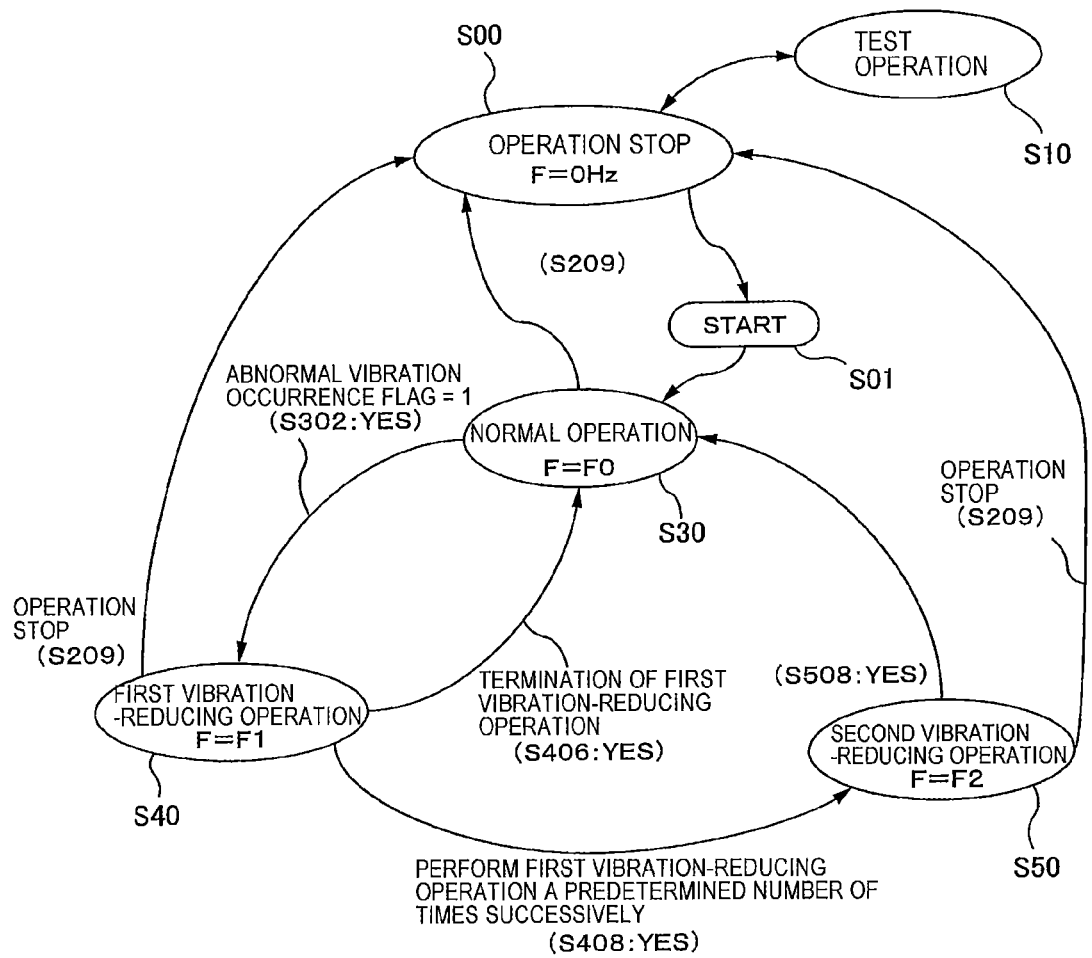
FIG. 18 is a diagram showing detection/non-detection of an abnormal vibration by the first motor-side vibration sensor, the second motor-side vibration sensor and the inverter-side vibration sensor in the case shown in FIG. 16.
FIG. 19 is a state transition diagram illustrating change in the operating state of the electric motor assembly.

In particular, as shown in FIG. 17, the controller 23 compares the vibration levels of the current measured vibration values of the inverter-side vibration sensor 36 with the threshold value A1 (see step S180 of FIG. 17) and, when at least one of the vibration levels of the current measured vibration values of the inverter-side vibration sensor 36 is more than the threshold value A1 (step S180, Yes), compares the vibration levels of the current measured vibration values of the first motor-side vibration sensor 31 with the threshold value A2 (see step S182 of FIG. 17). When at least one of the vibration levels of the current measured vibration values of the first motor-side vibration sensor 31 is more than the threshold value A2 (step S182, Yes), the controller 23 compares the vibration levels of the current measured vibration values of the second motor-side vibration sensor 35 with the threshold value A3 (see step S184 of FIG. 17). When at least one of the vibration levels of the current measured vibration values of the second motor-side vibration sensor 35 is more than the threshold value A3 (step S184, Yes), the controller 23 determines if the frequency ranges, in which the vibrations more than the threshold values A have been detected by the inverter-side vibration sensor 36, the first motor-side vibration sensor 31 and the second motor-side vibration sensor 35, are the same or not (see step S186 of FIG. 17). When the controller 23 determines that the frequency ranges are the same (step S186, Yes), then the controller 23 determines that an abnormality has occurred in the chassis of the electric motor assembly 100 (step S188), and terminates the process of the flow chart of FIG. 17. When in step S186 at least one of the frequency ranges, in which the vibrations more than the threshold values A have occurred, is different from the others (step S186, No), the controller 23 terminates the process of the flow chart of FIG. 17 without identifying the cause of the abnormal vibration.

The controller 23 terminates the process of the flow chart of FIG. 17 without identifying the cause of the abnormal vibration when the vibration levels of the current measured vibration values of the inverter-side vibration sensor 36 are not more than the threshold value A1 (step S180, No), when the vibration levels of the current measured vibration values of the first motor-side vibration sensor 31 are not more than the threshold value A2 (step S182, No), or when the vibration levels of the current measured vibration values of the second motor-side vibration sensor 35 are not more than the threshold value A3 (step S184, No).

The controller 23 determines that an abnormality has occurred in the motor casing 4 and the inverter housing 24 as a whole, i.e. in the chassis of the electric motor assembly 100 when the measured vibration value(s) of the first motor-side vibration sensor 31, the measured vibration value(s) of the second motor-side vibration sensor 35 and the measured vibration value(s) of the inverter-side vibration sensor 36 exceed the threshold values A1 to A3. Upon the occurrence of an abnormality in the chassis of the electric motor assembly 100, the first motor-side vibration sensor 31, the second motor-side vibration sensor 35 and the inverter-side vibration sensor 36 detect an abnormal vibration, having an amplitude of not less than a certain level, at the same frequency(s) (f1, f2, f3 in this example).

As shown in FIG. 16, when the first motor-side vibration sensor 31, the second motor-side vibration sensor 35 and the inverter-side vibration sensor 36 all detect an abnormal vibration, the controller 23 can determine the occurrence of an abnormality in the chassis of the electric motor assembly 100 based only on the threshold values A1 to A3. Upon the occurrence of an abnormality in the chassis of the electric motor assembly 100, the controller 23 continues the operation of the electric motor assembly 100 while issuing an alarm. In the case of the occurrence of an abnormality in the chassis of the electric motor assembly 100, there is little possibility of the abnormality significantly affecting the electric motor assembly 100 itself. It is, therefore, preferred to continue the operation of the electric motor assembly 100.

Abnormality that occurs and a particular measured vibration value corresponding to the abnormality vary depending on the construction and/or the installation environment of the pump 50 and the electric motor assembly 100. A combination of manners of detection by a single or a plurality of vibration sensors may be varied accordingly. While the first to fourth causes of abnormal vibration have been described using the same symbols A, B of threshold values, it is possible to use different threshold values for the first to fourth causes.

According to this embodiment, the controller 23 can identify the cause of an abnormal vibration by detecting the abnormal vibration with the plurality of vibration sensors. Therefore, the operator can quickly take a measure, such as replacement of a part, to eliminate the abnormal vibration.

The cause of an abnormal vibration, once identified by the above-described method, may be maintained until the controller 23 checks elimination of the cause. In particular, the cause may be maintained until all the current measured vibration values of the first motor-side vibration sensor 31, the second motor-side vibration sensor 35 and the inverter-side vibration sensor 36 during operation of the pump become not more than the threshold values A and/or the cause is reset by the operator. Alternatively, the cause of an abnormal vibration may be maintained only during the period when all the conditions for identifying the cause are met. Upon the identification of the cause of an abnormal vibration, the controller 23 may notify it by means of the operation panel 66, the external terminal 63 and/or the input/output unit 65. Further, the controller 23 may store the identified cause of the abnormal vibration as a history in the storage unit 60.

While the method for identifying the cause of an abnormal vibration of the electric motor assembly 100 has been described, the abnormal vibration determination method can also be applied to the pump apparatus 200 (see FIG. 2) provided with the pump-side vibration sensor 56.

In the method of the above-described embodiment, the controller 23 determines an abnormal vibration of the electric motor assembly 100. When the pump apparatus 200 is used as a lifeline such as a feed or drainage pump apparatus, it is preferred to continue the operation of the pump 50 as long as possible. In such a case, therefore, the controller 23 performs a vibration-reducing operation (first vibration-reducing operation, second vibration-reducing operation), which involves change of the rotational speed of the motor 3, based on vibration values detected by at least one of the vibration detectors, namely the first motor-side vibration sensor 31, the second motor-side vibration sensor 35 and the inverter-side vibration sensor 36. A method for performing the vibration-reducing operation which can continue the operation of the pump 50 as long as possible will now be described with reference to the drawings.

FIG. 19 is a state transition diagram illustrating change in the operating state of the electric motor assembly 100. The state transition of FIG. 19 may be performed repeatedly with arbitrary timing (e.g. a few msec to a few hundred msec) after power-on of the controller 23. Further, the state transition of FIG. 19 may be performed in parallel with the processes of the flow charts of FIGS. 8, 11, 14 and 17. In FIG. 19, the same symbols are used for the same processings as those of the below-described FIGS. 20 to 23, and a description thereof is partly omitted.

The change in the operating state of the electric motor assembly 100, shown in FIG. 19, will be described first. The electric motor assembly 100 is in an operation stop state S00 at the time of the first power-on after the installation or after the completion of maintenance of the pump apparatus 200. When the test operation is performed as necessary in a test operation mode S10 (see FIG. 5) through a user's mode-switching operation, the process of the flow chart of FIG. 5 is performed, and the operating state of the electric motor assembly 100 returns to the operation stop state S00 upon the completion of the test operation mode S10 (see step S104 of FIG. 5). The operating state of the electric motor assembly 100 is shifted, e.g. by a user's manual operation, from the operation stop state S00 to a START state S01 in which processing of the controller 23, such as initialization, is performed. Subsequently, the operating state of the electric motor assembly 100 is shifted to a normal operating state S30 e.g. by an automatic or manual operation to decrease the discharge pressure. The START state S01 may be omitted.

When the electric motor assembly 100 is in the normal operating state S30, the controller 23 sets the rotational speed F of the motor 3 to the below-described normal rotational speed F0. When in the process of the flow chart of FIG. 20, which is performed while the electric motor assembly 100 is in a first vibration-reducing operation state S40, the measured vibration value(s) becomes more than the threshold value(s) B (step S208, Yes) and the operation of the electric motor assembly 100 is stopped (step S209), the operating state of the electric motor assembly 100 returns to the operation stop state S00. When the measured vibration value(s) of the electric motor assembly 100 becomes more than the threshold value(s) A and less than the threshold value(s), i.e. when an abnormal vibration with an abnormality occurrence flag=1 (step S206) occurs (step S302, Yes) while the electric motor assembly 100 is in the normal operating state S30, the operating state of the electric motor assembly 100 shifts to the first vibration-reducing operation state S40.

When the electric motor assembly 100 is in the first vibration-reducing operation state S40, the controller 23 sets the rotational speed F of the motor 3 to the below-described first rotational speed F1. When in the process of the flow chart of FIG. 20, which is performed while the electric motor assembly 100 is in the first vibration-reducing operation state S40, the measured vibration value(s) becomes more than the threshold value(s) B (step S208, Yes) and the operation of the electric motor assembly 100 is stopped (step S209), the operating state of the electric motor assembly 100 returns to the operation stop state S00. When the first vibration-reducing operation is completed (step S406, Yes), the operating state of the electric motor assembly 100 returns to the normal operating state S30. When in step S408 of FIG. 22 the first vibration-reducing operation state S40 is repeated a predetermined number of times (step S408, Yes), the operating state of the electric motor assembly 100 shifts from the first vibration-reducing operation state S40 to a second vibration-reducing operation state S50.

When the electric motor assembly 100 is in the second vibration-reducing operation state S50, the controller 23 sets the rotational speed F of the motor 3 to the below-described second rotational speed F2. When in the process of the flow chart of FIG. 20, which is performed while the electric motor assembly 100 is in the second vibration-reducing operation state S50, the measured vibration value(s) becomes more than the threshold value(s) B (step S208, Yes) and the operation of the electric motor assembly 100 is stopped (step S209), the operating state of the electric motor assembly 100 returns to the operation stop state S00. The operating state of the electric motor assembly 100 can be returned from the second vibration-reducing operation state S50 to the normal operating state S30 by user's resetting of an alarm as a trigger.

Thus, the controller 23 can perform a vibration-reducing operation in two steps, namely the first vibration-reducing operation state S40 and the second vibration-reducing operation state S50. This makes it possible to continue the operation of the electric motor assembly 100 as long as possible.

Figure 20:
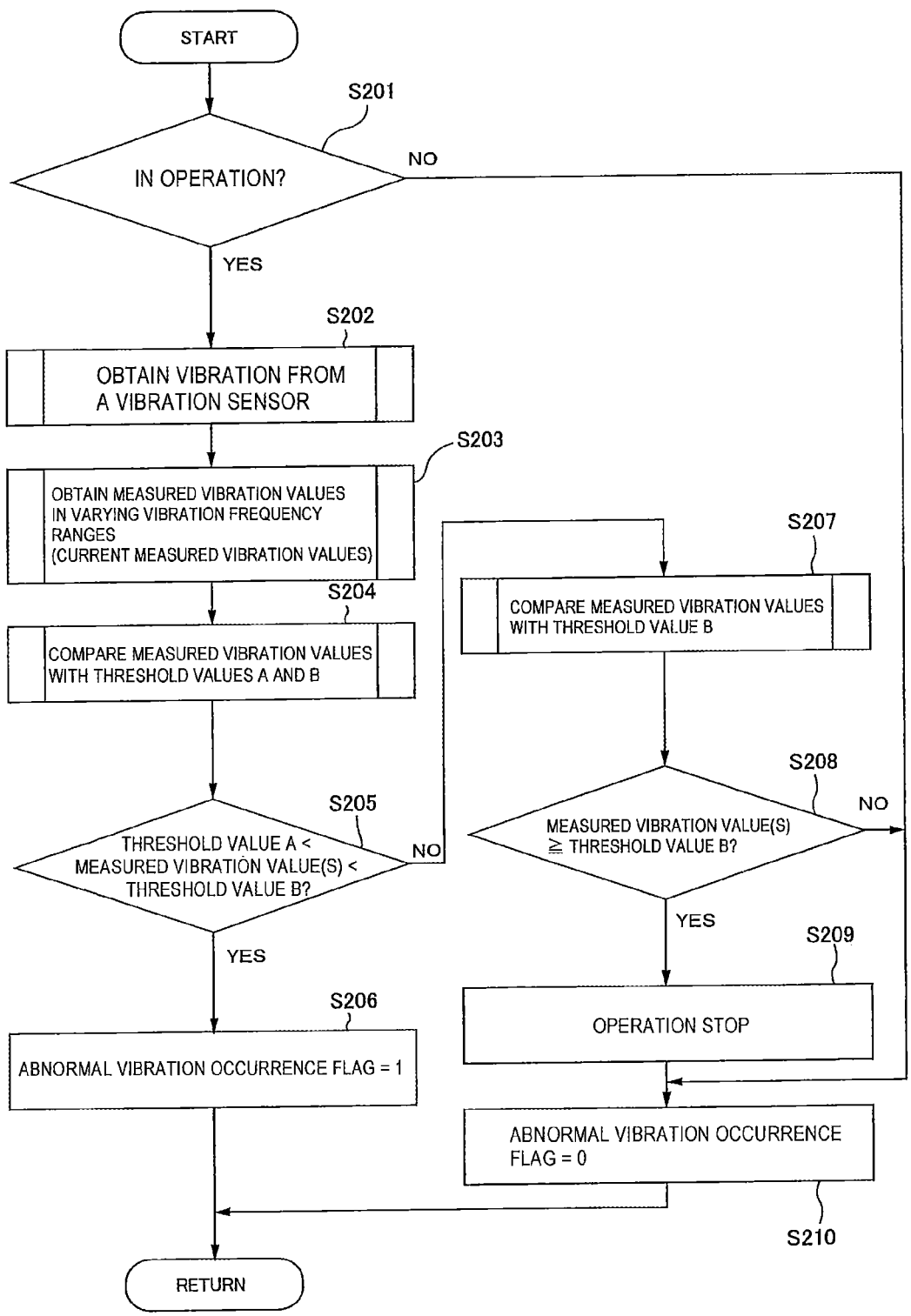
FIG. 20 is a diagram showing a flow chart of a process for detecting an abnormal vibration of the electric motor assembly by means of the controller.
Figure 21:
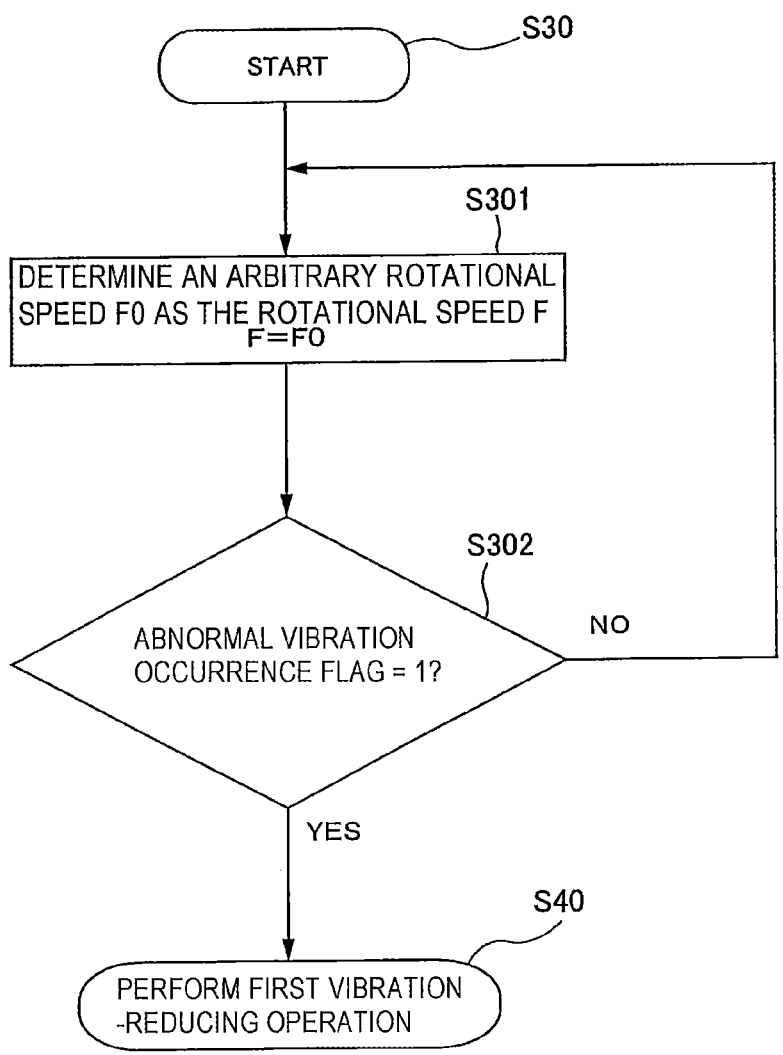
FIG. 21 is a diagram showing a flow chart of a normal operation.
Figure 22:
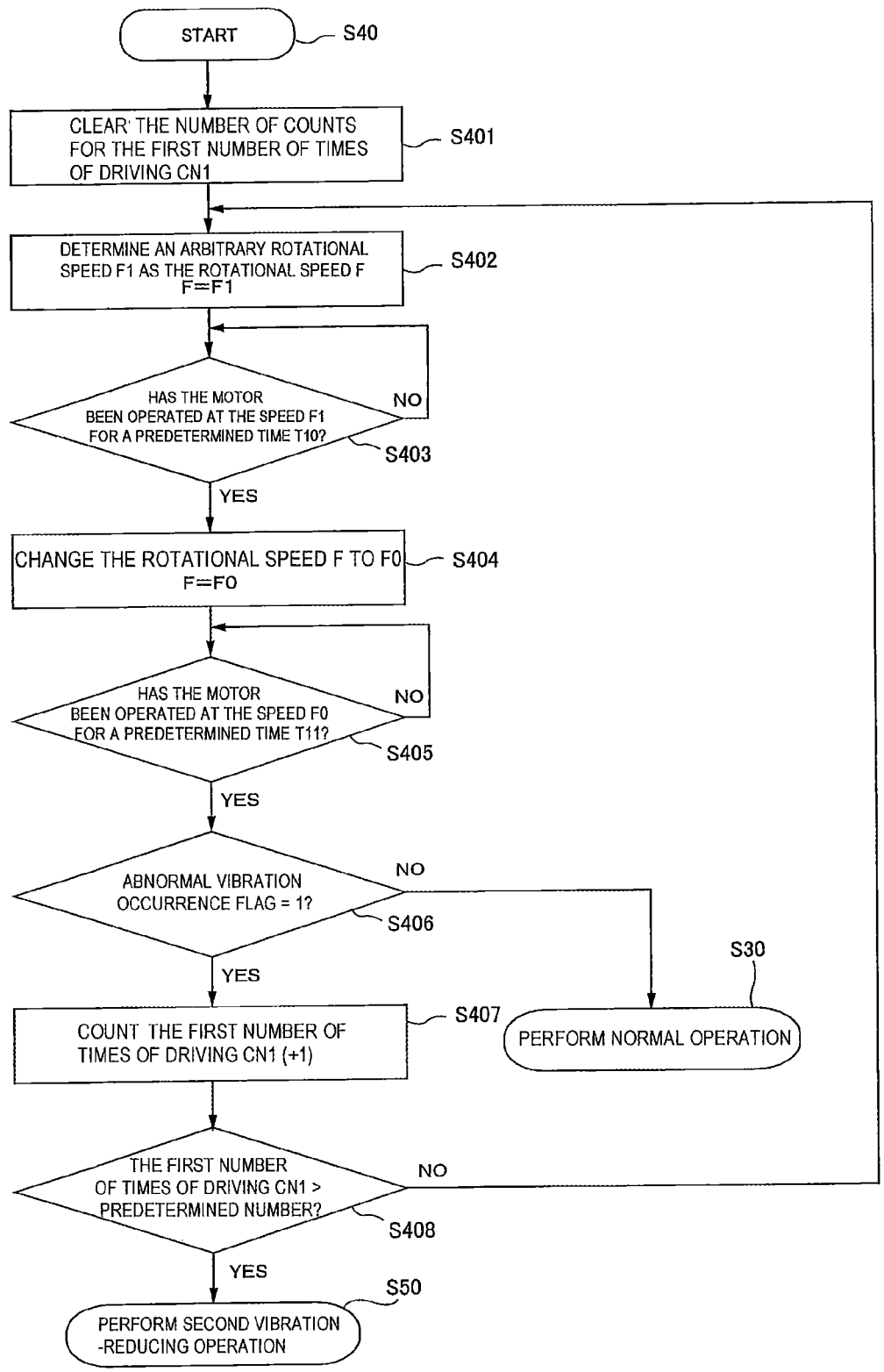
FIG. 22 is a diagram showing a flow chart of a first vibration-reducing operation.
Figure 23:
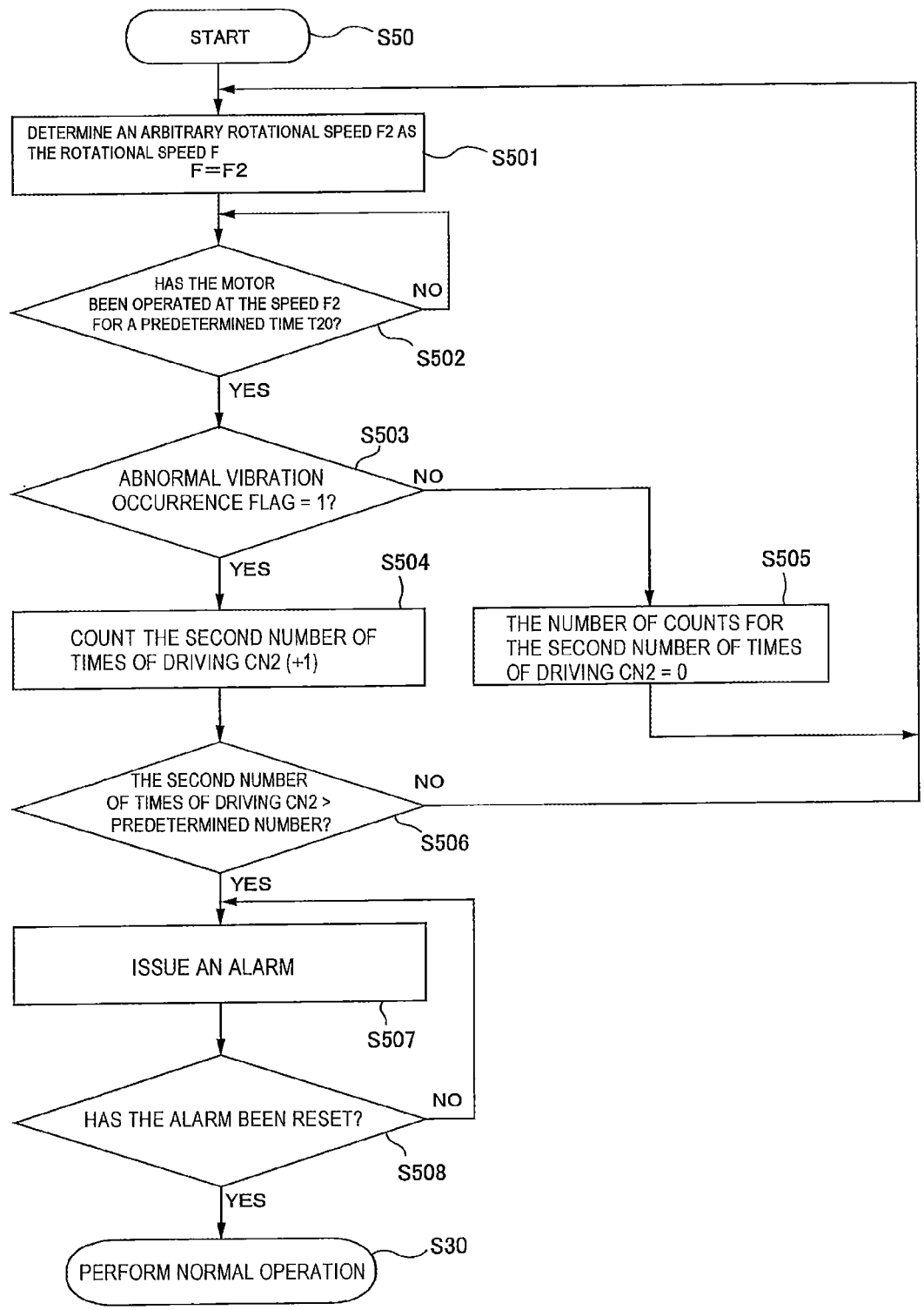
FIG. 23 is a diagram showing a flow chart of a second vibration-reducing operation.

The normal operating state S30, the first vibration-reducing operation state S40 and the second vibration-reducing operation state S50 will now be described in detail with reference to the flow charts of FIGS. 20 through 23. FIG. 20 shows a flow chart of a process for detecting an abnormal vibration of the electric motor assembly by means of the controller 23. FIG. 21 shows a flow chart of the normal operation performed by the controller 23. FIG. 22 shows a flow chart of the first vibration-reducing operation performed by the controller 23. FIG. 23 shows a flow chart of the second vibration-reducing operation performed by the controller 23. Referring to the state transition diagram of FIG. 19, the processes of the flow charts of FIGS. 20 and 21 are performed in parallel in the normal operating state S30, the processes of the flow charts of FIGS. 20 and 22 are performed in parallel in the first vibration-reducing operation state S40, and the processes of the flow charts of FIGS. 20 and 23 are performed in parallel in the second vibration-reducing operation state S50.

The operation of the controller 23 during operation of the electric motor assembly 100 will now be described with reference to FIG. 20. During automatic operation of the electric motor assembly 100, the controller 23 performs the process of the flow chart of FIG. 20 repeatedly with an arbitrary period (timing).

When the electric motor assembly 100 is not in operation (step S201, No), the controller 23 temporarily leaves the process of the flow chart of FIG. 20 with an abnormal vibration occurrence flag=0 (step S210), the particulars of which will be described later. When the electric motor assembly 100 is in operation (step S201), the controller 23 obtains vibrations, sent from a vibration sensor(s), with an arbitrary period (timing) (step S202). Thereafter, the controller 23 analyzes (performs a Fourier transform on) the vibrations, sent from the vibration sensor(s), to obtain vibration values (V1, V2, V3 . . . Vn) as measured vibration values in a plurality of vibration frequency ranges (f1, f2, f3 . . . fn) (step S203).

The controller 23 compares a measured vibration value(s) for each of the vibration frequency ranges with the threshold value A and the threshold value B (step S204) and, when at least one of the measured vibration values is more than the threshold value A and less than the threshold value B (step S205, Yes), determines that an abnormal vibration has occurred in the electric motor assembly 100 (at least one of the motor section 10 and the inverter section 20), and sets an abnormal vibration occurrence flag to value 1 (step S206). The controller 23 may also perform the above-described processes of the flow charts of FIGS. 8, 11, 14 and 17 to identify the cause of the abnormal vibration of a component of the electric motor assembly 100. The abnormal vibration occurrence flag is a flag to be set to value 1 in the case of: the threshold value A<the measured vibration value(s)<the threshold value B, and is initialized to value 0 with timing such as power-on of the controller 23, stoppage of the motor 3, detection of threshold value A≥measured vibration values, etc.

If step S205 of FIG. 20 is "No", the controller 23 compares the measured vibration value(s) for each of the vibration frequency ranges with the threshold value B (step S207). When at least one of the measured vibration values is more than the threshold value B (step S208, Yes), the controller 23 stops the operation of the electric motor assembly 100 (step S209). In this case, the controller 23 may output error information to the outside, i.e. issue an alarm to the operation panel 66 and the external terminal 63, simultaneously with the stoppage of the motor 3. Thereafter, the controller 23 clears the abnormal vibration occurrence flag (step S210).

When all the compared measured vibration values are less than the threshold value B (step S208, No), the controller 23 determines that the measured vibration values are all within the normal range (the measured vibration values≤the threshold value A), and initializes the abnormal vibration occurrence flag to value 0 (step S210).

The normal operating state S30 will now be descried with reference to FIG. 21. At the timing of shifting from the START state S01 to the normal operating state S30 in the state transition diagram of FIG. 19, the controller 23 starts the process of the flow chart of FIG. 21. The normal operating state of the pump apparatus 200 herein refers to the state when the pump 50 is in pumping operation at a specified point. As shown in step S301 of FIG. 21, in the normal operating state S30, the controller 23 determines a normal rotational speed F0, which is an arbitrary rotational speed, as the rotational speed F of the motor 3, and drives the motor 3 at the normal rotational speed F0. The normal rotational speed F0 is the rotational speed (normal rotational speed) of the motor 3 during the normal operation of the electric motor assembly 100. In one embodiment, the normal rotational speed F0 is the rotational speed at a specified point, which is the intersection between the specified pump head and the specified capacity in a performance curve diagram of the pump 50.

The normal rotational speed F0 of the pump 50 in the normal operating state S30 is controlled by the controller 23 using, for example, constant discharge pressure control which controls the rotational speed of the pump 50 in such a manner that a target pressure of the discharge pressure of the pump 50 is maintained at a predetermined set pressure, constant estimated end-pressure control which controls the rotational speed of the pump 50 in such a manner that the end pressure at a water supply destination is maintained at a predetermined set pressure, constant current control which controls the rotational speed of the pump 50 in such a manner that the value of a not-shown current sensor is maintained at a predetermined value, constant flow rate control which controls the rotational speed of the pump 50 in such a manner that the flow rate value of the flow rate sensor 72 is maintained at a predetermined value, or constant rotational speed control which controls the rotational speed of the pump 50 in such a manner that the rotational speed of the motor 3 is maintained at a predetermined value.

Next, in step S302, the controller 23 determines whether the abnormal vibration occurrence flag is value 1 or not. If the abnormal vibration occurrence flag has been set to value 1 in step S206 of FIG. 20, i.e. when the current vibration level(s) is more than the threshold value A (step S302, Yes), the process proceeds to the first vibration-reducing operation of FIG. 22 (step S40). If the abnormal vibration occurrence flag is value 0 (step S302, No), the process returns to step S301 to continue the normal operating state step S30.

The first vibration-reducing operation state S40 will now be described with reference to FIG. 22. In the first vibration-reducing operation of FIG. 22, the rotational speed F of the motor 3 is changed and the motor 3 is operated at a first rotational speed F1 which differs from the normal rotational speed F0. The change in the rotational speed of the motor 3 is likely to eliminate the cause of vibration. For example, the change causes stirring of a fluid in the pump 50, whereby foreign matter adhering to e.g. the impeller 53 may be removed. The value of the first rotational speed F1 may be an arbitrary value. In one embodiment, the value of the first rotational speed F1 may be a value obtained by adding, subtracting or multiplying an arbitrary value to, from or by the value of the normal rotational speed F0. In another embodiment, the value of the first rotational speed F1 may vary depending on a first number of times of driving CN1 which indicates the number of times of driving of the motor 3 at the first rotational speed F1. If the "abnormal vibration region" has been stored in the test operation S10 of the pump 50, the controller 23 may set a target pressure or the first rotational speed F1 in such a manner as to avoid the "abnormal vibration region". If reference vibration values at varying rotational speeds have been stored in the storage unit 60, the controller 23 may select one or more rotational speeds from those rotational speeds which correspond to the maximum value of the vibration levels of the reference vibration values, and may set the first rotational speed F1 in such a manner as to avoid the selected rotational speed(s). Thus, the rotational speed(s), which causes vibration whose measured value(s) is more than the threshold value A, can be estimated from the reference vibration values and can be avoided in the first vibration-reducing operation.

First, upon shifting from the normal operating state S30 to the first vibration-reducing operation state S40, the controller 23 checks the number of counts for the first number of times of driving CN1 as shown in step S401 of FIG. 22 and, when there is the number of counts, clears the number of counts for the first number of times of driving CN1. Next, the controller 23 determines the first rotational speed F1 as the rotational speed F of the motor 3 (see step S402 of FIG. 22), and operates the motor 3 at the first rotational speed F1 for a predetermined time T10 (see step S403, No). After the elapse of the predetermined time T10 (step S403, Yes), the controller 23 again changes the rotational speed F of the motor 3 to the normal rotational speed F0 (see step S404).

Thereafter, the controller 23 operates the motor 3 at the normal rotational speed F0 for a predetermined time T11 (see step S405, No). After the elapse of the predetermined time T11 (step S405, Yes), the controller 23 determines whether the abnormal vibration occurrence flag is value 1 (step S406). The time T10 (first period of time) and the time T11 (second period of time) are, for example, a few seconds to a few tens of minutes, and may be the same or different.

If the abnormal vibration occurrence flag has been set to value 1 in step S206 of FIG. 20 (see step S406, Yes), the controller 23 adds 1 to the first number of times of driving CN1 (step S407). The number of counts for the first number of times of driving CN1 is stored in the storage unit 60 of the controller 23. When the first number of times of driving CN1 is more than a predetermined number N (N is an arbitrary natural number not less than 1) (see "Yes" in step S408 of FIG. 22), i.e. when the first vibration-reducing operation has been performed a predetermined number of times successively, the controller 23 shifts the process to the second vibration-reducing operation state S50 (see step S50 of FIG. 22). The operation of the controller 23 upon the shift to the second vibration-reducing operation state S50 of FIG. 23 in the case of the first vibration-reducing operation having been performed a predetermined number of times successively ("Yes" in step S408) will be described below. It should be noted, however, that when step S406 is "Yes", the first vibration-reducing operation may be continued without performing the second vibration-reducing operation. In that case, the process returns to S402 without shifting to the second vibration-reducing operation state S50. The possibility of eliminating the cause of vibration is increased by changing the rotational speed F of the motor 3 the predetermined number of times.

When the abnormal vibration occurrence flag is value 0 in step 406 of FIG. 22 (when the abnormal vibration occurrence flag has not been set to value 1 in step 206 of FIG. 20), step S406 is "No": the first vibration-reducing operation is terminated, and the process shifts to the normal operating state S30 (step S30).

The second vibration-reducing operation state S50 will now be described with reference to FIG. 23. In the second vibration-reducing operation of FIG. 23, the rotational speed F of the motor 3 is changed and the motor 3 is operated at a second rotational speed F2 which differs from the normal rotational speed F0 and the first rotational speed F1. The value of the second rotational speed F2 may be an arbitrary value. In one embodiment, the value of the second rotational speed F2 may be a value obtained by adding, subtracting or multiplying an arbitrary value to, from or by the value of the normal rotational speed F0 or the value of the first rotational speed F1. In another embodiment, the value of the second rotational speed F2 may vary depending on a second number of times of driving CN2 which indicates the number of times of driving of the motor 3 at the second rotational speed F2. Alternatively, as with the first rotational speed F1, the second rotational speed F2 may be set based on the measured vibration values or the reference vibration values in the test operation S10 of the pump 50. In the case where vibration levels are stored, in relation to varying rotational speeds, in the storage unit 60, a rotational speed which corresponds to a lower vibration level than that corresponding to the first rotational speed F1, may be set as the second rotational speed F2. In general, a rotating device rotating at a lower speed is less affected by vibration. Therefore, the second rotational speed F2 may be set to be lower than the first rotational speed F1.

As shown in step S501 of FIG. 23, the controller 23 determines an arbitrary second rotational speed F2 as the rotational speed F of the motor 3, and operates the motor 3 at the second rotational speed F2 for a predetermined time T20 (see step S502, No). After the elapse of the predetermined time T20 (step S502, Yes), the controller 23 determines whether the value of the abnormal vibration occurrence flag is 1 or not.

If the value of the abnormal vibration occurrence flag is 1 (set to value 1 in step S206 of FIG. 20) (step S503, Yes), the controller 23 adds 1 to the second number of times of driving CN2 (step S504). The number of counts for the second number of times of driving CN2 is stored in the storage unit 60 of the controller 23.

When the second number of times of driving CN2 is more than a predetermined number NN (NN is an arbitrary natural number not less than 1) (step S506, Yes), i.e. when the second vibration-reducing operation has been performed a predetermined number of times successively, the controller 23 outputs error information to the outside, i.e. issue an alarm (step S507). Thereafter, the controller 23 operates the electric motor assembly 100 until the alarm is reset while maintaining the rotational speed F of the motor 3 at the second rotational speed F2 (step S508). Upon resetting of the alarm (step S508, Yes), the controller 23 returns the operating state of the electric motor assembly 100 to the normal operating state S30 of FIG. 21. Thus, the operation of the electric motor assembly 100 can be continued by operating the electric motor assembly 100 until the alarm is reset while maintaining the rotational speed F of the motor 3 at the second rotational speed F2.

Returning to step S503, when the value of the abnormal vibration occurrence flag is 0 (see "No" in step S503 of FIG. 23), the controller 23 clears the number of counts for the second number of times of driving CN2 (step S505), and performs step S501 of FIG. 23 again. A reduction in abnormal vibration due to the change of the rotational speed F of the motor 3 to the second rotational speed F2 is considered to be the cause of "No" is step S503. Therefore, the operation of the pump 50 is continued while maintaining the rotational speed F of the motor 3 at the second rotational speed F2 even after step S503 has turned to "No". This can more securely continue feeding of water as compared to the case of returning the rotational speed F of the motor 3 to the normal rotational speed F0 or the first rotational speed F1. When the second number of times of driving CN2 is not more than the predetermined number (step S506, No), the controller 23 performs step S501 of FIG. 23 again, and avoids the issuance of an alarm.

The first vibration-reducing operation and the second vibration-reducing operation, performed in the above-described manner, can avoid the measured vibration value(s) from exceeding the threshold value B, and thus can avoid stoppage of the pump 50 due to abnormal vibration.

While the vibration-reducing operations have been described in the case where an abnormal vibration has occurred in the electric motor assembly 100, the controller 23 can perform similar vibration-reducing operations also in the case where an abnormal vibration has occurred in the pump 50. The above-described vibration-reducing operations are performed based on the detection values of at least one of the first motor-side vibration sensor 31, the second motor-side vibration sensor 35, the inverter-side vibration sensor 36 and the pump-side vibration sensor 56. However, the electric motor assembly 100 may be provided with at least one other vibration detector, and a vibration-reducing operation may be performed based on the detection values of the vibration detector(s).

Embodiment 2

While the above-described test operation of Embodiment 1 is performed with the valve 75 on the discharge side of the pump 50 fully closed, the below-described test operation of Embodiment 2 is performed while operating the pump 50 with the valve 75 open. A description of the same method and construction as those of the above-described embodiment may sometimes be omitted below.

In this embodiment, the controller 23 increases the rotational speed of the motor 3 stepwise with the valve 75 open so that the pump 50 is operated at the maximum efficiency point or a specified point. A flow rate value (measured flow rate value) at a rotational speed at each step may be obtained based on the flow rate detected by the flow rate sensor 72.

An operation flow chart in the test operation mode of this embodiment will now be described with reference to FIG. 5. First, the user makes preparations for the start of the test operation. In step S101, the user first adjusts the degree of opening of the valve 75 so that the pump 50 will be operated at the maximum efficiency point or a specified point. Further, the user makes preparations, such as powering-on of the pump apparatus 200, switching to the test operation mode, etc. (see step S101 of FIG. 5). Next, the test operation of the pump apparatus 200 is started e.g. by a user's operation as a trigger (see step S102 of FIG. 5).

The controller 23 increases the rotational speed of the motor 3 to a predetermined rotational speed (e.g. a rated rotational speed) in a stepwise manner, and obtains vibration values (measured vibration values) at rotational speeds at the respective steps (see step S103 of FIG. 5). In one embodiment, the controller 23 increases the frequency of the inverter 22 from 0 Hz to a maximum frequency (e.g. 50 Hz) stepwise at 5-Hz intervals (0 Hz, 5 Hz, 10 Hz, . . . 45 Hz, 50 Hz). Alternatively, the rotational speed of the motor 3 may be increased in a stepwise manner by stepwise increasing a target pressure, and controlling the rotational speed of the motor 3 so that the discharge pressure of the pump 50 is equal to the target pressure. At a frequency at each step, a measured vibration value, obtained after waiting for a predetermined time (e.g. about 10 seconds) until the frequency and the discharge pressure become stable, is stored in the storage unit 60.

Also in this embodiment, the measured vibration values of the respective vibration sensors may be stored in the storage tables Tb11, Tb12, Tb13 and Tb14 shown in FIG. 6.

When excessive vibration has occurred at a particular rotational speed during the test operation of the pump 50, the controller 23 may store at least one of the rotational speed, the discharge flow rate at the rotational speed and the discharge pressure at the rotational speed in the "abnormal vibration region" of the storage unit 60 as in Embodiment 1.

Further, the controller 23 may obtain discharge pressures and discharge flow rates at rotational speeds at the respective steps, and store the data in the storage tables. The controller 23 can thus associate the discharge pressures and the discharge flow rates with the vibration values, and can therefore identify a vibration caused by the flow rate that acts on the pump 50. When the pump apparatus 200 is, for example, a booster pump or the like for a direct water supply equipment, whose suction pressure is subject to change, suction pressures at rotational speeds at the respective steps may be stored in the storage tables Tb11, Tb12, Tb13, Tb14. It is also possible to store pressure values each obtained by subtracting a suction pressure from the corresponding discharge pressure.

Next, upon completion of the measurement of vibration values until measurement at the predetermined rotational speed in step S103 of FIG. 5, the test operation mode is terminated e.g. by a user's operation as a trigger, thereby completing the test operation of the pump apparatus 200 (see step S104 of FIG. 5). Since the measured vibration values of the storage tables Tb11 to Tb14, stored in step S103, are vibration values of the pump apparatus 200 in the normal state, the controller 23 can detect an abnormal vibration of the pump apparatus 200 based on the measured vibration values of the storage tables Tb11 to Tb14.

The discharge flow rate of the pump 50 is proportional to the rotational speed. Accordingly, the controller 23 can associate the discharge flow rate of the pump 50 with the vibration values, and can therefore obtain a measured value of vibration caused by the flow rate of a fluid being transferred by the pump 50.

The controller 23 detects an abnormal vibration based on the measured vibration values as in Embodiment 1. It is possible that the intensity of vibration that occurs in the pump apparatus 200 may increase with increase in the flow rate of a fluid being transferred by the pump apparatus 200. Therefore, the numerical value (indicating a certain percentage or ratio), which is to be added to or multiplied by the measured vibration values of the storage tables Tb11 to Tb13, may be increased with increase in the flow rate of the fluid.

According to this embodiment, the controller 23 can more accurately determine the occurrence of an abnormal vibration of a component of the pump apparatus 200 by comparing the measured vibration values of at least one of the first motor-side vibration sensor 31, the second motor-side vibration sensor 35, the inverter-side vibration sensor 36 and the pump-side vibration sensor 56 with a threshold value obtained by the same method as the above-described method.

The above-described method for correcting a threshold value, which serves as a benchmark for an abnormal vibration of the pump apparatus 200, can be applied also to the electric motor assembly 100 (see FIG. 1).

Variation

Figure 24:
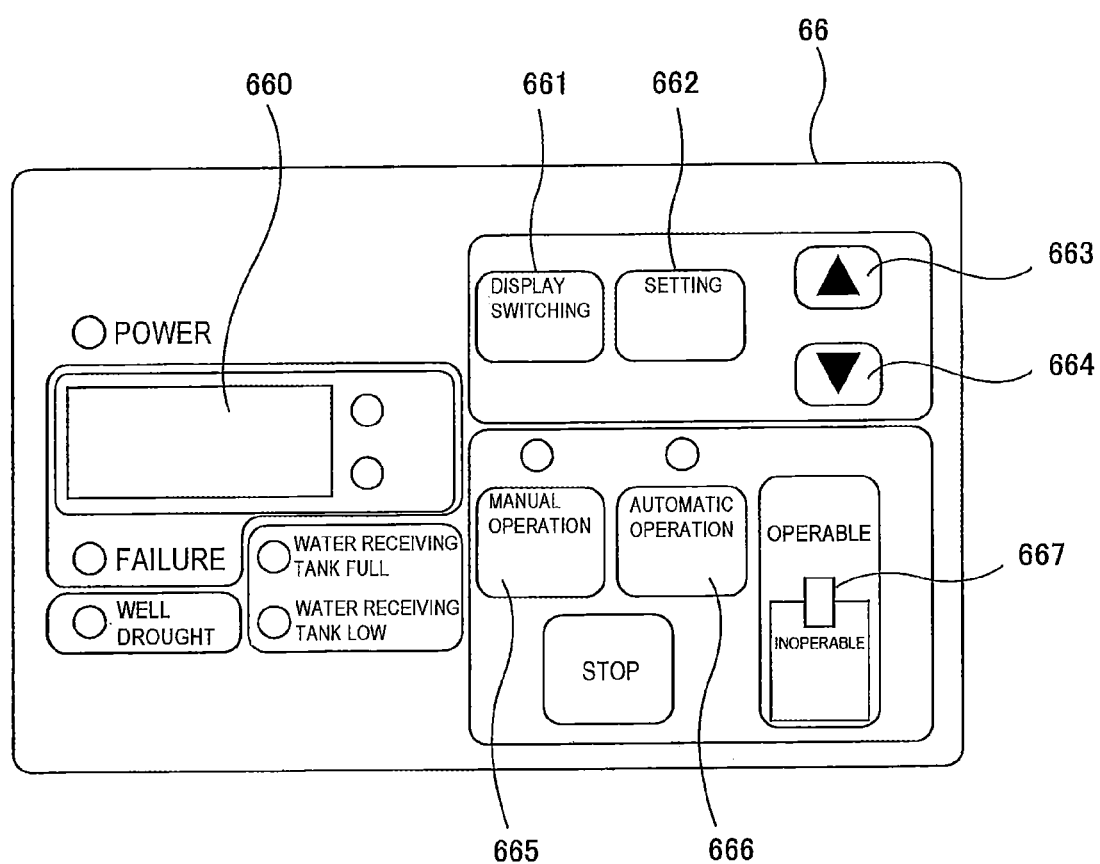
FIG. 24 is a diagram showing an example of an operation panel of a pump apparatus according to a variation.

In the above-described Embodiments 1 and 2, the storage of measured vibration values in the storage tables Tb11 to Tb14 is performed in the test operation mode of the controller 23; however, measured vibration values may be stored by a manual operation of the pump 50. FIG. 24 shows an example of the operation panel 66 of a pump apparatus 200 according to this variation. The operation panel 66 includes a multi-digit (e.g. four-digit) 7-segment LED 660 for displaying informations of the storage unit 60, display switching buttons 661 for switching display contents of the 7-segment LED 660, setting buttons 662 for performing a user's setting change, an up-button 663 for addition to a value or display item of the 7-segment LED 660, a down-button 664 for subtraction from a value or display item of the 7-segment LED 660, a manual operation button 665 for selecting a manual operation of the pump 50, an automatic operation button 666 for selecting an automatic operation of the pump 50, and an operation selection switch 667 for selecting operable/inoperable for the pump 50. The operation panel 66 may be comprised of a touch screen-type liquid crystal display or the like as long as the below-described functions are satisfied.

The operation panel 66 has means capable of inputting a rotational speed of the pump 50 by a user's manual operation; the user can arbitrarily set a frequency of the inverter 22 in the range from 0 Hz to a maximum frequency (e.g. 50 Hz) by a manual operation. In particular, the user depresses the manual operation button 665 to select the manual operation and, with the operation selection switch 667 in the operation-permissible mode, makes an addition or subtraction to or from a rotational speed of the pump 50, displayed on the 7-segment LED 660, using the up-button 663 or the down-button 664. In this manner, the user can arbitrarily set a rotational speed of the pump 50.

The operation panel 66 and the external terminal 63 may display the rotational speed of the pump 50 and the current measured vibration values. In particular, the user depresses the display switching buttons 661 to display the rotational speed of the pump 50 and the current measured vibration values on the 7-segment LED 660. The operation panel 66 further has setting means for inputting measured vibration values and setting the inputted measured vibration values in the storage tables Tb11 to Tb14. In particular, the user selects a measured vibration value to be inputted and displays the value on the 7-segment LED 660 with the display switching buttons 661, inputs the measured vibration value to be set with the up-button 663 or the down-button 664, and depresses the setting button. In this manner, the user can set the inputted measured vibration value in the storage tables Tb11 to Tb14.

In this variation, after the preparation in step S101 of FIG. 5, the user starts the manual operation of the pump apparatus 200 in step S102 and, in step S103, the user increases the rotational speed of the motor 3 stepwise up to a predetermined rotational speed (e.g. a rated rotational speed), and obtains vibration values (measured vibration values) at rotational speeds at the respective steps.

In one embodiment, the user increases the frequency of the inverter 22 from 0 Hz to a maximum frequency (e.g. 50 Hz) stepwise at 5-Hz intervals (0 Hz, 5 Hz, 10 Hz, . . . 45 Hz, 50 Hz). The user visually checks measured vibration values at a frequency at each step on the operation panel 66 or the external terminal 63, and stores the measured vibration values in the storage tables Tb11 to Tb14 shown in FIG. 6. In particular, a not-shown "storage button" may be provided in the controller 23 or the external terminal 63 so that by a user's operation of the "storage button", the measured vibration values can be stored in the storage tables Tb11 to Tb14. Alternatively, the user may display measured vibration values at each step on the 7-segment LED 660, record the displayed measured vibration values in a paper medium or a storage medium, and set the recorded measured vibration values in the storage tables Tb11 to Tb14 by inputting the values from the operation panel 66 or the external terminal 63. Alternatively, the user may store measured vibration values at each step in a storage unit (not shown) of the external terminal 63, and write the measured vibration values, stored in the external terminal 63, in the controller 23 e.g. by communication.

Next, upon completion of the measurement of vibration values until measurement at the predetermined rotational speed in step S103 of FIG. 5, the user stops the pump, thereby completing the manual test operation of the pump apparatus 200 (see step S104 of FIG. 5). After the completion of the test operation of the pump apparatus 200, the user may store the measured vibration values of the storage tables Tb11 to Tb14, obtained in step S103.

Also according to this variation, the controller 23 can more accurately determine the occurrence of an abnormal vibration of a component of the pump apparatus 200 by comparing the measured vibration values of at least one of the first motor-side vibration sensor 31, the second motor-side vibration sensor 35, the inverter-side vibration sensor 36 and the pump-side vibration sensor 56 with a threshold value, obtained from the data of the storage tables Tb11 to Tb14, by the same method as that of the above-described embodiment.

While the present invention has been described with reference to the embodiments thereof, it will be understood that the present invention is not limited to the particular embodiments described above, but it is intended to cover changes and modifications within the inventive concept.

What is claimed is:

1. A motor assembly comprising:
a motor;
an inverter as a speed changing means for the motor, and
a controller for controlling the motor, wherein the motor assembly has a first bearing disposed on a counter-load side of the motor and which rotatably supports a drive shaft of the motor, and a second bearing disposed on a load side of the motor and which rotatably supports the drive shaft, and the motor assembly comprises a first motor-side vibration sensor for detecting a vibration of the first bearing, a second motor-side vibration sensor for detecting a vibration of the second bearing, and an inverter-side vibration sensor for detecting a vibration of the inverter, and wherein the controller detects an abnormal vibration based on values detected by the first motor-side vibration sensor, the second motor-side vibration sensor and the inverter-side vibration sensor, wherein the controller calculates vibration levels of values, detected by the first motor-side vibration sensor, the second motor-side vibration sensor and the inverter-side vibration sensor, for each of varying frequency ranges, and stores the calculated vibration levels as measured vibration values in a storage unit, wherein the controller has at least one predetermined threshold value to be compared with at least one of the vibration levels, and wherein when a state in which the at least one vibration levels of the measured vibration values is not more than the threshold values is termed a first state, and a state in which the at least one vibration levels of the measured vibration values is more than the threshold values is termed a second state, the controller detects the abnormal vibration when at least one of the vibration levels is in the second state, and identifies a cause of the abnormal vibration based on the measured vibration values, wherein it is determined that an abnormality has occurred in the drive shaft when the inverter-side vibration sensor is in the first state, the first motor-side vibration sensor is in the second state, and the second motor-side vibration sensor is in the second state and, in addition, a first abnormal vibration detected by the first motor-side vibration sensor and a second abnormal vibration detected by the second motor-side vibration sensor belong to a same frequency range.

2. The motor assembly according to claim 1, wherein the controller determines that an abnormality has occurred in the first bearing when the inverter-side vibration sensor is in the first state, the first motor-side vibration sensor is in the second state, and the second motor-side vibration sensor is in the first state; and the controller determines that an abnormality has occurred in the second bearing when the inverter-side vibration sensor is in the first state, the first motor-side vibration sensor is in the first state, and the second motor-side vibration sensor is in the second state.

3. The motor assembly according to claim 1, wherein the controller determines that an abnormality has occurred in an inverter section including the inverter when the inverter-side vibration sensor is in the second state, the first motor-side vibration sensor is in the first state, and the second motor-side vibration sensor is in the first state.

4. The motor assembly according to claim 1, wherein the controller determines that an abnormality has occurred in a chassis of the motor assembly when the inverter-side vibration sensor is in the second state, the first motor-side vibration sensor is in the second state, and the second motor-side vibration sensor is in the second state.

5. The motor assembly according to claim 1, wherein the storage unit has a storage table which, when a rotational speed of the pump is increased stepwise to a predetermined rotational speed, stores a measured vibration value measured at each step, wherein the controller increases the rotational speed of the pump stepwise to the predetermined rotational speed in a test operation, and stores, as a measured test vibration value, the measured vibration value measured at each step in the storage table, and wherein the controller determines the at least one predetermined threshold value by adding or multiplying a numerical value, which indicates a certain percentage or ratio, to or by the measured test vibration value, or by calculating one of an average value, a maximum value and a minimum value of the measured test vibration values as a representative value, and adding or multiplying a predetermined value to or by the representative value, or by calculating a correction amount which is a difference between the measured test vibration value and a predetermined reference vibration value, and determining the at least one predetermined threshold value based on the calculated correction value.

6. A motor assembly comprising:
a motor;
an inverter as a speed changing means for the motor; and
a controller for controlling the motor, wherein the motor assembly comprises at least one vibration detector for detecting a vibration of the motor assembly, and
wherein the controller performs a vibration-reducing operation, which involves a change of a rotational speed of the motor, based on measured vibration values of the at least one vibration detector,
wherein the vibration-reducing operation comprises a first vibration-reducing operation which comprises:
changing the rotational speed of the motor to a predetermined first rotational speed and operating the motor at the predetermined first rotational speed for a predetermined first period of time, and then returning the rotational speed of the motor to an original rotational speed and operating the motor at the original rotational speed for a predetermined second period of time.

7. The pump apparatus according to claim 6, wherein the controller comprises a storage unit for storing the measured vibration values measured by the at least one vibration detector, the storage unit having a storage table which, when a rotational speed of the pump is increased stepwise to a predetermined rotational speed, stores a measured vibration value measured at each step.

8. The pump apparatus according to claim 7, wherein the controller comprises a test operation mode for increasing the rotational speed of the pump stepwise to the predetermined rotational speed, and storing the measured vibration values measured at each step.

9. The pump apparatus according to claim 8, wherein in the test operation mode, the controller increases the rotational speed of the pump stepwise to the predetermined rotational speed while keeping a discharge side of the pump shut off.

10. The pump apparatus according to claim 7, wherein an abnormal vibration of the pump is detected based on the measured vibration values stored in the storage table.

11. The pump apparatus according to claim 7, wherein the storage unit has an abnormal vibration region for storing the condition of the pump apparatus at a time of a particular rotational speed of the pump at which excessive vibration has occurred, and wherein the controller controls the pump to avoid a condition of the pump apparatus, stored in the abnormal vibration region.

12. The pump apparatus according to claim 7, wherein the storage unit further stores a predetermined reference vibration value, and a threshold value which serves as a benchmark for an abnormal vibration of the pump, and wherein the controller calculates a correction amount which is a difference between the measured vibration value and a reference vibration value, stored in the storage table, and corrects the threshold value based on the correction amount.

13. The pump apparatus according to claim 7, wherein the controller further comprises an input/output unit for inputting a signal from a pressure detector for detecting a discharge pressure of the pump, and wherein the controller stores in the storage unit a value of the discharge pressure of the pump at the rotational speed of the pump at each step, stored in the storage table.

14. The pump apparatus according to claim 7, wherein the pump apparatus comprises, as the at least one vibration detector, a first motor-side vibration sensor disposed adjacent to an inverter-side first bearing, a second motor-side vibration sensor disposed adjacent to a second bearing disposed on an opposite side of the electric motor from the first bearing, and an inverter-side vibration sensor mounted to the inverter or an internal surface of an inverter housing that houses the inverter.

15. The motor assembly according to claim 6, wherein the controller stores, as an abnormal vibration region, a condition at a time of the rotational speed of the motor at which excessive vibration has occurred, and wherein the predetermined first rotational speed avoids the abnormal vibration region.

16. The motor assembly according to claim 6, wherein the controller calculates a vibration level of a value, detected by the at least one vibration detector, for each of varying frequency ranges and, when a state in which the vibration level is not more than a predetermined first threshold value is termed a first state, and a state in which the vibration level is more than the first threshold value is termed a second state, the controller performs the vibration-reducing operation when at least one of the vibration levels is in the second state.

17. The motor assembly according to claim 16, wherein the controller stores reference vibration values at varying rotational speeds, and selects one or more rotational speeds from those rotational speeds which correspond to a maximum value of the vibration levels of the reference vibration values, and wherein the predetermined first rotational speed avoids the selected one or more rotational speeds.

18. The motor assembly according to claim 16, wherein the controller has a storage table which, when the rotational speed of the motor is increased stepwise to a predetermined rotational speed, stores the vibration level at each step as a measured vibration value, wherein the controller increases the rotational speed of the motor stepwise to the predetermined rotational speed in a test operation, and stores, as a measured test vibration value, the measured vibration value measured at each step in the storage table, and wherein the controller determines the first threshold value and the second threshold value by adding or multiplying a numerical value, which indicates a certain percentage or ratio, to or by the measured test vibration value, or by calculating one of an average value, a maximum value and a minimum value of the measured test vibration values as a representative value, and adding or multiplying a predetermined value to or by the representative value, or by calculating a correction amount which is a difference between the measured test vibration value and a predetermined reference vibration value, and determining the first threshold value and the second threshold value based on the calculated correction value.

19. The motor assembly according to claim 16, wherein after operating the motor for the predetermined second period of time in the first vibration-reducing operation, the controller determines whether the vibration levels are in a first state and, when the vibration levels are in the first state, terminates the first vibration-reducing operation.

20. The motor assembly according to claim 19, wherein after operating the motor for the second period of time in the first vibration-reducing operation, the controller determines whether the vibration levels are in a second state and, when the vibration levels are in the second state, adds 1 to a first number of times of driving which indicates the number of times of driving of the motor at the predetermined first rotational speed and, when the first number of times of driving is more than a predetermined number, performs a second vibration-reducing operation which comprises operating the motor at a second rotational speed which differs from the predetermined first rotational speed.

21. The motor assembly according to claim 20, wherein the value of the predetermined first rotational speed is a value obtained by adding, subtracting or multiplying an arbitrary value to, from or by the value of a normal rotational speed, which is the rotational speed of the motor during a normal operation of the motor assembly, or a value that varies depending on the first number of times of driving.

22. The motor assembly according to claim 20, wherein after performing the second vibration-reducing operation by operating the motor at the second rotational speed for a predetermined third period of time, the controller determines whether the vibration level is in the second state and, when the vibration level is in the second state, adds 1 to a second number of times of driving which indicates the number of times of driving of the motor at the second rotational speed and, when the second number of times of driving is more than a predetermined number, issues an alarm.

23. The motor assembly according to claim 22, wherein the controller operates the motor at the second rotational speed until the alarm is reset.

24. The motor assembly according to claim 22, wherein a value of the second rotational speed is a value obtained by adding, subtracting or multiplying an arbitrary value to, from or by the value of a normal rotational speed or the value of the predetermined first rotational speed, or a value that varies depending on the second number of times of driving, or a value set based on reference vibration values at varying rotational speeds of the motor.

* * * * *